(12) United States Patent
Sunaga et al.

(10) Patent No.: US 6,875,819 B2
(45) Date of Patent: Apr. 5, 2005

(54) FLUORINATED CYCLOOLEFIN POLYMERS, PROCESSES FOR PREPARATION OF FLUORINATED CYCLOOFEFIN MONOMERS AND POLYMERS THEREOF, AND USE OF THE SAME

(75) Inventors: Tadahiro Sunaga, Sodegaura (JP); Hiroshi Kouno, Sodegaura (JP); Kazumori Kawamura, Sodegaura (JP); Takashi Ochiai, Sodegaura (JP); Shigeto Shigematsu, Yamaguchi (JP); Takashi Nakano, Sodegaura (JP); Tomoyuki Morita, Kyoto (JP); Yoshihiro Yamamoto, Sodegaura (JP); Hirofumi Io, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 32 days.

(21) Appl. No.: 10/312,506

(22) PCT Filed: Apr. 25, 2002

(86) PCT No.: PCT/JP02/04140
§ 371 (c)(1),
(2), (4) Date: Dec. 27, 2002

(87) PCT Pub. No.: WO02/088216
PCT Pub. Date: Nov. 7, 2002

(65) Prior Publication Data
US 2003/0187168 A1 Oct. 2, 2003

(30) Foreign Application Priority Data
Apr. 27, 2001 (JP) .......................... 2001-132434
Mar. 11, 2002 (JP) .......................... 2002-64653

(51) Int. Cl.[7] ................................. C08F 8/04
(52) U.S. Cl. ..................... 525/326.2; 525/332.1; 525/338; 525/339; 525/356
(58) Field of Search ............... 525/326.2, 332.1, 525/338, 339, 356

(56) References Cited

U.S. PATENT DOCUMENTS 5,677,405 A  * 10/1997  Goodall et al. ............ 526/281
6,121,340 A     9/2000  Shick et al.
6,593,058 B1 *  7/2003  Feiring et al. ........... 430/270.1

FOREIGN PATENT DOCUMENTS

| JP | 63-238111 | 10/1988 |
|----|-----------|---------|
| JP | 01-131214 | 5/1989 |
| JP | 01-131215 | 5/1989 |
| JP | 2-4722 | 1/1990 |
| JP | 03-039963 | 2/1991 |
| JP | 03-067262 | 3/1991 |
| JP | 04-104155 | 4/1992 |
| JP | 2001-27803 A | 1/2001 |
| WO | WO 98/36324 A1 | 8/1998 |
| WO | WO 00/17712 A1 | 3/2000 |
| WO | WO 00/67072 A1 | 11/2000 |

OTHER PUBLICATIONS

XP–002241583 (9 pages).
XP–002241506 (1 page).
T.M. Bloomstein et al.; J. Vac. Sci. Technol. B 15(6), Nov./Dec. 1997, pp. 2112–2116.
Hiroshi Ito et al.; 1998 American Chemical Society Symposium, Ser. 706, Chapter 16, pp. 208–223.

* cited by examiner

Primary Examiner—Bernard Lipman
(74) Attorney, Agent, or Firm—Birch, Stewart, Kolasch & Birch, LLP

(57) ABSTRACT

The present invention is to provide a fluorine-containing polymer having excellent light transmission in the vacuum ultraviolet region of not more than 193 nm, a monomer favorably used for preparing the fluorine-containing polymer, a process for preparing the fluorine-containing polymer, and uses of the fluorine-containing polymer. The fluorine-containing polymer has at least a repeated unit structure represented by the following formula (1) and has an absorption coefficient of not more than 3.0 $\mu m^{-1}$ at 157 nm of ultraviolet rays.

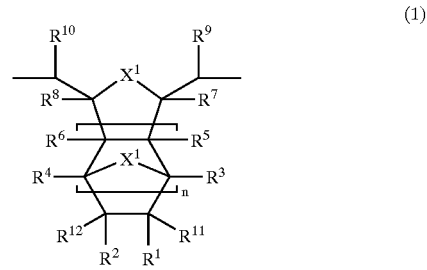

(1)

wherein $R^1$ to $R^{12}$ are each fluorine, a fluorine-containing alkyl group of 1 to 20 carbon atoms, or the like; $X^1$ is $—CR^aR^b—$, $—NR^a—$ or $—PR^a—$ ($R^a$ and $R^b$ are each fluorine, a fluorine-containing alkyl group of 1 to 20 carbon atoms, hydrogen, $—O—$, $—S—$, an alkyl group of 1 to 20 carbon atoms, or the like); at least one of $R^1$ to $R^{12}$ and $X^1$ is fluorine or a fluorine-containing group; and n is 0 or an integer of 1 to 3.

15 Claims, 6 Drawing Sheets

FLUORINATED CYCLOOLEFIN POLYMERS, PROCESSES FOR PREPARATION OF FLUORINATED CYCLOOFEFIN MONOMERS AND POLYMERS THEREOF, AND USE OF THE SAME

This application is the national phase under 35 U.S.C. §371 of PCT International Application No. PCT/JP02/04140 which has an International filing date of Apr. 25, 2002, which designated the United States of America.

FIELD OF THE INVENTION

The present invention relates to a fluorine-containing cycloolefin polymer, a cycloolefin monomer thereof, a process for preparing the polymer and uses of the polymer. More particularly, the invention relates to a fluorine-containing cycloolefin polymer which has excellent heat resistance, light resistance and light transmission and is favorably used as a material for a semiconductor fine process using vacuum ultraviolet rays, a cycloolefin monomer used as a monomer for preparing the polymer, a process for preparing the polymer, and uses of the fluorine-containing cycloolefin polymer, such as an optical part, a thin film, a coating material, a pellicle, a photoresist composition, and a process for forming a pattern by lithography using the photoresist composition.

BACKGROUND OF THE INVENTION

In recent years, high integration of semiconductor integrated circuits has been developed, and large-scale integrated circuits (LSI) or very large scale integrated circuits (VLSI) have been put into practical use. With such use, the minimum pattern of the integrated circuit tends to be in the sub-micron region and the lithographic technique tends to become finer. For forming a fine pattern, it is essential to use lithographic technique comprising coating a substrate having a thin film formed thereon with a resist, placing as a dust-proofing film a pellicle over the resist-coated substrate to prevent adhesion of a foreign substance such as dust, conducting light exposure to form a latent image of desired pattern, developing the latent image to form a resist pattern, conducting dry etching using the resist pattern as a mask and then removing the resist to obtain a desired pattern.

In the lithographic technique, ultraviolet rays of g-line (wavelength: 436 nm) or i-line (wavelength: 365 nm) are used as exposure light, and with fining of patterns, far-ultraviolet rays, vacuum ultraviolet rays, electron beam (EB), X-rays, etc., which have shorter wavelengths, have been used as exposure lights. Especially recently, laser beams (KrF excimer laser beam of a wavelength of 248 nm, ArF excimer laser beam of a wavelength of 193 nm, F2 laser beam of a wavelength of 157 nm) are paid attention as exposure lights, and are expected to be useful for the formation of fine patterns.

There is no polymer that transmits a light of such ultraviolet region of shorter wavelength, particularly the vacuum ultraviolet (VUV) region such as a region of F2 laser beam of 157 nm, and it is difficult to select a material.

By the way, Bloomstein, et al. have reported that $MgF_2$ and $CaF_2$ are promising optical materials as inorganic optical materials in the field using lights of vacuum ultraviolet region (J. Vac. Sci. Technol. B15, 2112, 1997). In this report, it is also reported that, as an organic polymer material, Teflon (registered trademark) is better than PMMA, PVC and PAA in the transmittance and it exhibits a transmittance of about 83% in case of a film of 0.1 μm thickness. It has been further reported that with regard to siloxane polymers, methylsiloxane exhibits a transmittance of about 70% in case of a film of 0.1 μm thickness, though the transmittance is not so high.

Examples of the resist materials include a copolymer of a bicyclo structure comprising norbornene having bistrifluoromethyl carbinol as a functional group and sulfone (ACS Symp. Ser. 706, 208, 1998), a copolymer of a fluorine-containing ethylenically unsaturated compound monomer such as tetrafluoroethylene and a polycyclic ethylenically unsaturated compound monomer such as norbornene (WO 00/17712), a fluorinated polymer obtained from a compound having an ethylenically double bond in which a functional group of bistrifluoroalkyl carbinol —C(Rf)(Rf')OH (Rf and Rf' are the same or different fluoroalkyl groups) is introduced, and a copolymer of this fluorinated polymer and TFE (WO 00/67072).

Although the OH group tends to improve adhesion to the silicon substrate, the OH group present near the fluorine atom is increased in the acidity and thereby reacts with a carboxylic acid residue formed by the acid decomposition to cause gelation.

The dust-proofing film such as a pellicle used for the lithography comprises a pellicle frame made of aluminum or the like and a transparent membrane made of a resin such as nitrocellulose spread on one side surface of the frame, and can be fitted on a mask by, for example, applying an adhesive on the other side surface of the frame. According to the pellicle, introduction of a foreign substance onto the circuit pattern surface from the outside can be prevented, and even if a foreign substance adheres to the pellicle membrane, an image of the foreign substance is out of the focal point in the exposure of the light and is not transferred, so that a trouble hardly takes place.

As described above, use of lights having shorter wavelengths has been promoted with the fining down of the minimum pattern of the integrated circuit, and with this promotion, development of materials of thin films withstanding energy of the exposure light of shorter wavelength has been made. For example, when KrF excimer laser is used as the exposure light source, a fluorine-containing polymer having a relatively small absorption in the far-ultraviolet region, such as a commercially available fluorine-containing resin CYTOP (trade name, available from Asahi Glass Co., Ltd.) or a commercially available fluorine-containing resin Teflon (registered trademark) AF (trade name, available from U.S. DuPont Co.), is used for a pellicle membrane (Japanese Patent Laid-Open Publication No. 39963/1991, Japanese Patent Laid-Open Publication No. 104155/1992, etc.).

In order to solve a problem of light transmission caused by light scattering properties due to the crystallizability of fluorine-containing polymers synthesized from fluorine-containing ethylenically unsaturated compounds such as tetrafluoroethylene and vinylidene fluoride, perfluoro aliphatic cyclic polymers obtained by radical cyclization polymerization of perfluoro bifunctional unsaturated compound monomers or radical polymerization of perfluorocyclic monomers have been proposed (Japanese Patent Laid-Open Publications No. 238111/1988, No. 131214/1989, No. 131215/1989 and No. 67262/1991), and these polymers exhibit sufficient transmission to ultraviolet rays of 193 nm. Further, it has been reported that a thin film of a copolymer of ethylene tetrafluoride and propylene hexafluoride or a polymer having siloxane bond (WO 98/36324) is used as a pellicle membrane when ultraviolet rays having wavelength of 140 to 200 nm are used as exposure light.

The transmittance of the perfluoro aliphatic cyclic polymers to the vacuum ultraviolet rays of 157 nm is relatively good, but because of synthesis by cyclization polymerization, the amount of fluorine contained in the monomer must be increased, and this causes development of water repellency. As a result, adhesion to the substrate is deteriorated. With regard to polymers which are obtained by ring-opening metathesis polymerization and has double bond and in which a part of fluorine atoms in the perfluoro aliphatic cyclic polymers are replaced with hydrogen atoms or organic groups, the light transmittance to the vacuum ultraviolet rays of 157 nm is lowered by light absorption of the double bond, and the absorption coefficient becomes extremely high. Further, because of the presence of the light absorption band at 157 nm, weathering resistance such as resistance to photodecomposition (photodeterioration) under the circumstances becomes worse, so that such polymers cannot be used. Therefore, further development of polymers excellent in both the weathering resistance and the adhesion and having extremely low light absorption coefficient in the vacuum ultraviolet region of 157 nm has been desired.

In order to solve the above problems, the present inventors have earnestly studied fluoropolymers, which are excellent in light transmission, optical properties, electrical properties, heat resistance, adhesion to substrate and light resistance and can be used as base polymers of optical coating materials or resist materials used for optical materials, thin films, lenses and the like. As a result, the present inventors have found that a novel fluorine-containing polymer satisfies various properties required for the optical coating materials or resist materials used for optical materials, thin films, lenses and the like. Based on the finding, the present invention has been accomplished.

That is to say, it is an object of the invention to provide a novel fluorine-containing polymer which can be used for optical coating materials or resist materials used for optical materials, thin films, lenses and the like and satisfies light transmission in the vacuum ultraviolet region of not more than 193 nm, particularly light transmission in the vacuum ultraviolet region of 157 nm, optical properties, electrical properties, heat resistance, adhesion to substrate and light resistance. It is another object of the invention to provide a monomer favorably used for preparing the polymer. It is a further object of the invention to provide a process for preparing the polymer. It is a still further object of the invention to pvovide uses of the polymer.

DISCLOSURE OF THE INVENTION

The fluorine-containing cycloolefin polymer according to the invention is characterized by having a repeated unit structure represented by the following formula (1) and having an absorption coefficient of not more than 3.0 $\mu m^{-1}$ to ultraviolet rays of 157 nm;

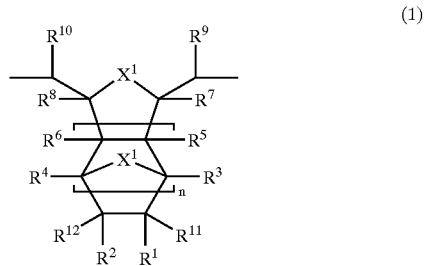

wherein at least one of $R^1$ to $R^{12}$ and $X^1$ is the following fluorine or fluorine-containing group, $R^1$ to $R^{12}$ are each fluorine or a fluorine-containing group selected from a fluorine-containing alkyl group of 1 to 20 carbon atoms, a fluorine-containing aryl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 2 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms, $X^1$ is a fluorine-containing group selected from —$CR^aR^b$—, —$NR^a$— and —$PR^a$— (with the proviso that at least one of $R^a$ and $R^b$ in —$CR^aR^b$— and $R^a$ in —$NR^a$— and —$PR^a$— are each selected from fluorine, a fluorine-containing alkyl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 2 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms), $R^1$ to $R^{12}$ other than $R^1$ to $R^{12}$ which are each fluorine or a fluorine-containing group in the formula (1) are each hydrogen or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms, when $X^1$ is a group other than a fluorine-containing group, $R^a$ and $R^b$ are each hydrogen or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms, and $X^1$ may be selected from —O— and —S—, at least two of $R^1$, $R^2$, $R^{11}$ and $R^{12}$ may be bonded to each other to form a cyclic structure, and n is 0 or an integer of 1 to 3.

The cycloolefin monomer of the fluorine-containing cycloolefin polymer according to the invention is represented by the following formula (2) or (3):

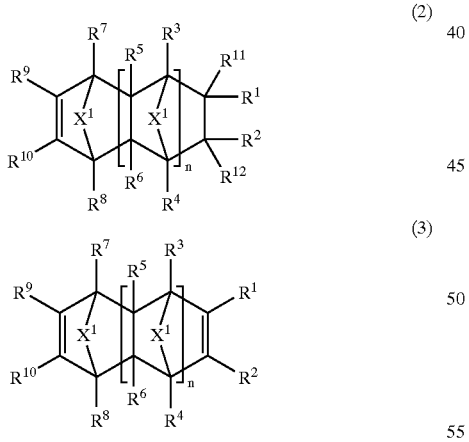

wherein at least one of $R^1$ to $R^1$ and $X^1$ in the formula (2) and at least one of $R^1$ to $R^{10}$ and $X^1$ in the formula (3) are each fluorine or a fluorine-containing group, $R^1$ to $R^{12}$ in the formula (2) and $R^1$ to $R^{10}$ in the formula (3) are each fluorine or a fluorine-containing group selected from a fluorine-containing alkyl group of 1 to 20 carbon atoms, a fluorine-containing aryl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 2 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms, $X^1$ in the formulas (2) and (3) is a fluorine-containing group selected from —$CR^aR^b$—, —$NR^a$— and —$PR^a$— (with the proviso that at least one of $R^a$ and $R^b$ in —$CR^aR^b$— and $R^a$ in —$NR^a$— and —$PR^a$— are each selected from fluorine, a fluorine-containing alkyl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 2 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms), $R^1$ to $R^{12}$ other than $R^1$ to $R^{12}$ which are each fluorine or a fluorine-containing group in the formula (2) and $R^1$ to $R^{10}$ other than $R^1$ to $R^{10}$ which are each fluorine or a fluorine-containing group in the formula (3) are each hydrogen or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms, when $X^1$ is a group other than a fluorine-containing group in the formulas (2) and (3), $R^a$ and $R^b$ are each hydrogen or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms, and $X^1$ may be selected from —O— and —S—, $R^1$, $R^2$, $R^{11}$ and $R^{12}$ in the formula (2) may be bonded to each other to form a cyclic structure, and $R^1$ and $R^2$ in the formula (3) may be bonded to each other to form a cyclic structure, and n is 0 or an integer of 1 to 3.

The process for preparing a fluorine-containing cycloolefin polymer according to the invention comprises subjecting at least one cycloolefin monomer represented by the formula (2) or (3) to ring-opening metathesis polymerization and then subjecting the obtained ring-opening metathesis polymer to at least one of hydrogenation, hydrogen fluoride addition and fluorine addition.

In the fluorine-containing cycloolefin polymer according to the invention, the repeated unit structure represented by the formula (1) is a repeated unit structure having a feature that the difference in the HOMO molecular orbital energy between a molecular model in which methyl group is bonded to each end of the unit structure and a molecular model which has the same carbon structure as the above molecular model but in which fluorine is replaced with hydrogen is in the range of 0.2 eV to 1.5 eV.

In the cycloolefin monomer, the total sum of the number of all fluorine atoms contained in $R^1$ to $R^{12}$ in the formula (2) and the total sum of the number of all fluorine atoms contained in $R^1$ to $R^{10}$ in the formula (3) are each not less than 3.

The fluorine-containing cycloolefin polymer according to the invention is preferably a polymer obtained using, as starting monomers, two or more cycloolefin monomers represented by the formula (2) or (3) and different from each other in at least one of $R^1$ to $R^{12}$, $R^1$ to $R^{10}$, $X^1$ and n. The fluorine-containing cycloolefin polymer is also preferably a polymer obtained using, as starting monomers, at least one cycloolefin monomer of the formula (2) or (3) wherein $X^1$ is —$CR^aR^b$— and at least one cycloolefin monomer of the formula (2) or (3) wherein $X^1$ is —O—. The fluorine-containing cycloolefin polymer is also a polymer obtained using, as starting monomers, the cycloolefin monomer represented by the formula (2) or (3) and a fluorine-containing monocycloolefin.

The fluorine-containing cycloolefin polymer according to the invention has a weight-average molecular weight (Mw), as measured by gel permeation chromatography (GPC), of 500 to 1,000,000 in terms of polystyrene.

Each of the optical part, the thin film and the coating material according to the invention comprises the fluorine-containing cycloolefin polymer. The pellicle according to the invention uses the thin film comprising the fluorine-containing cycloolefin polymer. The photoresist composition according to the invention contains the fluorine-containing cycloolefin polymer.

The process for forming a pattern by lithography according to the invention uses any one of the optical part, the thin film, the coating material, the pellicle and the photoresist composition.

BRIEF DESCRIPTION OF THE DRAWINGS

In FIG. 6, numeral 1 designates a pellicle membrane, numeral 2 designates a membrane adhesive, numeral 3 designates a frame, numeral 4 designates a mask adhesive, numeral 5 designates a liner, and numeral 6 designates an inside wall tacky agent.

PREFERRED EMBODIMENTS OF THE INVENTION

Figure 1:
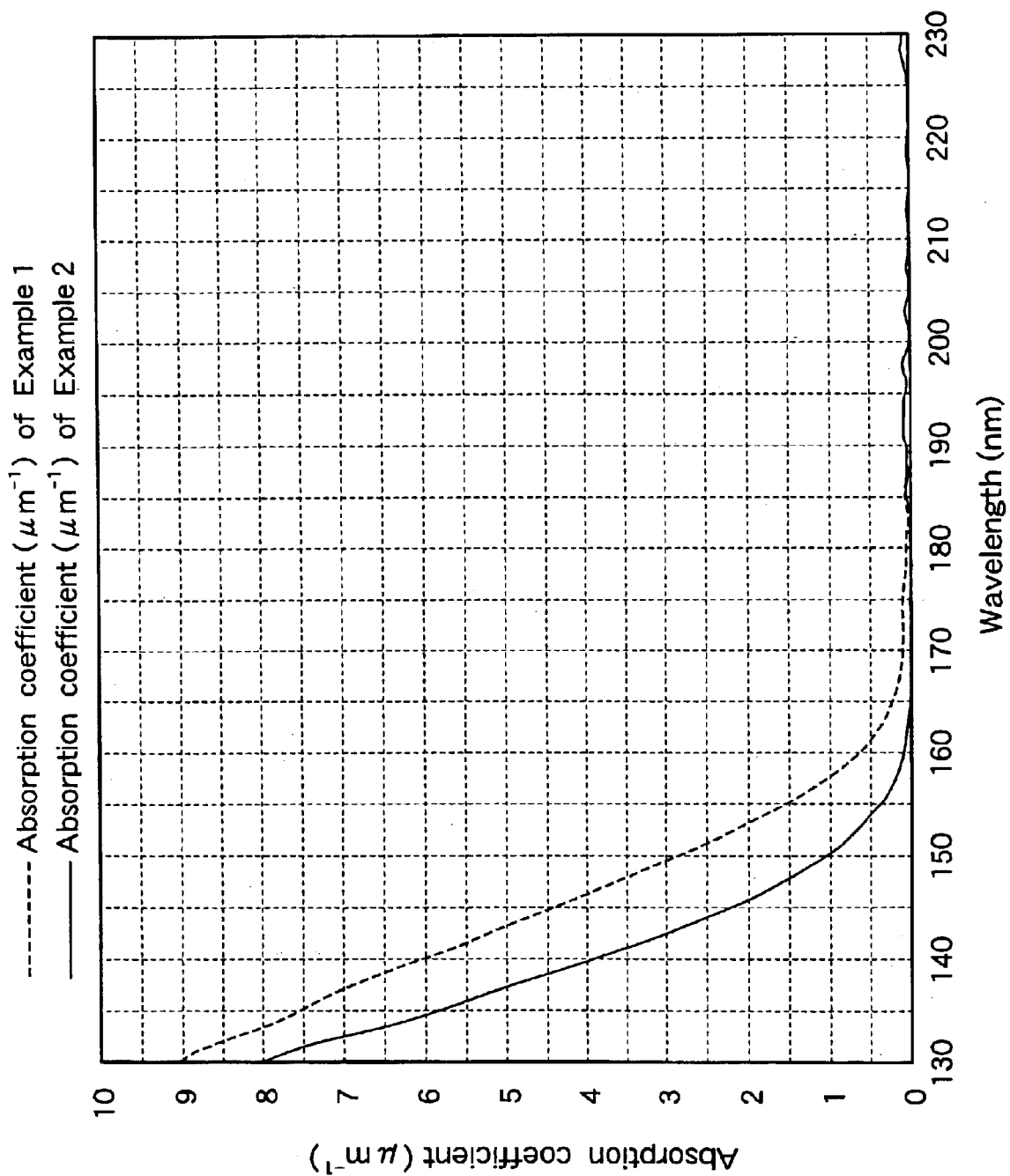
FIG. 1 shows VUV spectra of fluorine-containing cycloolefin polymers of Example 1 and Example 2.

The fluorine-containing cycloolefin polymer according to the invention, the cycloolefin monomer of the polymer, the process for preparing the polymer and uses of the polymer are described in detail hereinafter.

Fluorine-Containing Cycloolefin Polymer

The fluorine-containing cycloolefin polymer according to the invention has at least a unit structure represented by the following formula (1) in the repeated units of the polymer.

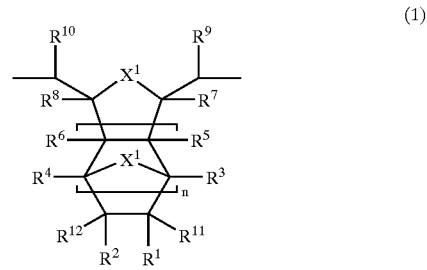

(1)

In the formula (1), at least one of $R^1$ to $R^{12}$ and $X^1$ is fluorine or a fluorine-containing group.

When at least one of $R^1$ to $R^{12}$ is fluorine or a fluorine-containing group, $R^1$ to $R^{12}$ are each, for example, fluorine or a fluorine-containing group selected from:

a fluorine-containing alkyl group of 1 to 20 carbon atoms, such as fluoromethyl, difluoromethyl, trifluoromethyl, trifluoroethyl, pentafluoroethyl, hexafluoroisopropyl, heptafluoroisopropyl, heptafluoropropyl, hexafluoro-2-methylisopropyl, nonafluorobutyl or perfluorocyclopentyl;

a fluorine-containing aryl group of 1 to 20 carbon atoms, such as pentafluorophenyl or heptafluoronaphthyl;

a fluorine-containing and silicon-containing alkyl group of 1 to 20 carbon atoms, such as trifluoropropyldimethylsilyl, tris(trifluoromethyl)silyl or perfluorooctyldi(trifluoromethyl)silyl;

a fluorine-containing alkoxy group of 1 to 20 carbon atoms, such as trifluoromethoxy, trifluoroethoxy, pentafluoropropoxy, pentafluorobutoxy, hexafluoro-2-methylisopropoxy, heptafluorobutoxy, perfluorocyclopentoxy, tetrafluoropyran-2-yloxy or perfluorofuran-2-yloxy;

a fluorine-containing and ether group-containing alkyl group of 2 to 20 carbon atoms, such as trifluoromethoxymethyl, trifluoroethoxymethyl, pentafluoropropoxymethyl, pentafluorobutoxymethyl, hexafluoro-2-methylisopropoxymethyl, heptafluorobutoxymethyl, 2,2-di(trifluoromethyl)dioxolanmethyl, tetrafluoropyran-2-yloxymethyl or perfluorofuran-2-yloxymethyl;

a fluorine-containing alkoxycarbonyl group of 2 to 20 carbon atoms, such as trifluoromethoxycarbonyl, trifluoroethoxycarbonyl, pentafluoropropoxycarbonyl, pentafluorobutoxycarbonyl, hexafluoro-2-methylisopropoxycarbonyl, heptafluorobutoxycarbonyl, perfluorocyclopentoxycarbonyl, tetrafluoropyran-2-yloxycarbonyl or perfluorofuran-2-yloxycarbonyl;

a fluorine-containing alkylcarbonyl group of 2 to 20 carbon atoms, such as trifluoromethylcarbonyl, trifluoroethylcarbonyl, pentafluoropropylcarbonyl, pentafluorobutylcarbonyl, hexafluoro-2-methylisopropylcarbonyl, heptafluorobutylcarbonyl, perfluorocyclopentylcarbonyl, tetrafluoropyran-2-ylcarbonyl or perfluorofuran-2-ylcarbonyl;

a fluorine-containing and ester group-containing alkyl group of 3 to 20 carbon atoms, such as carbotrifluoromethoxymethyl, carbotrifluoroethoxymethyl, carbopentafluoropropoxymethyl, carbopentafluorobutoxymethyl, carbo(hexafluoro-2-methylisopropoxy)methyl, carboheptafluorobutoxymethyl, carboperfluorocyclopentoxymethyl, carbotetrafluoropyran-2-yloxymethyl or carboperfluorofuran-2-yloxymethyl;

a fluorine-containing and carboxyl group-containing alkyl group of 2 to 20 carbon atoms, such as carboxytrifluoromethyl, carboxytetrafluoroethyl, carboxyhexafluoroisopropyl, carboxyhexafluoro-2-methylisopropyl or carboxyperfluorocyclopentyl;

a fluorine-containing and cyano group-containing alkyl group of 2 to 20 carbon atoms, such as 1-cyanotetrafluoroethyl or 1-cyanohexafluoropropyl; and a fluorine-containing and chlorine-containing alkyl group of 1 to 20 carbon atoms, a fluorine-containing and bromine-containing alkyl group of 1 to 20 carbon atoms and a fluorine-containing and iodine-containing alkyl group of 1 to 20 carbon atoms, such as bromotrifluoroethyl, bromotetrafluoroethyl, 2-bromotetrafluoroisopropyl and hexafluoro-2-bromomethylisopropyl.

When at least one $X^1$ is a fluorine-containing group, $X^1$ is selected from fluorine-containing groups, such as —$CR^aR^b$—, —$NR^a$— and —$PR^a$—.

At least one of $R^a$ and $R^b$ in —$CR^aR^b$— and $R^a$ in —$NR^a$— and —$PR^a$— are each selected from fluorine, a fluorine-containing alkyl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 1 to 20 carbon atoms, a fluorine-containing alkoxycarbonyl group of 1 to 20 carbon atoms, a fluorine-containing alkylcarbonyl group of 1 to 20 carbon atoms, a fluorine-containing and ester group-containing alkyl group of 1 to 20 carbon atoms, a fluorine-containing and carboxyl group-containing alkyl group of 1 to 20 carbon atoms, a fluorine-containing and cyano group-containing alkyl group of 1 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms. Examples of these groups include the same fluorine-containing groups as previously described with respect to $R^1$ to $R^{12}$.

When two or more of $R^1$ to $R^{12}$ in the formula (1) are each fluorine or a fluorine-containing group, they may be the same or different, and when two or more of $X^1$ in the formula (1) are each a fluorine-containing group, they may be the same or different.

In the formula (1), $R^1$ to $R^{12}$ other than $R^1$ to $R^{12}$ which are each fluorine or a fluorine-containing group are each, for example, hydrogen, chlorine, bromine, iodine or a group selected from:

an alkyl group of 1 to 20 carbon atoms, such as methyl, ethyl, propyl, isopropyl, n-butyl, tert-butyl, cyclohexyl or menthyl;

a silicon-containing alkyl group of 1 to 20 carbon atoms, such as trimethylsilyl, dimethylethylsilyl or dimethylcyclopentylsilyl;

an alkoxy group of 1 to 20 carbon atoms, such as methoxy, ethoxy, isopropoxy, tert-butoxy or menthoxy;

an alkoxycarbonyl group of 2 to 20 carbon atoms, such as methoxycarbonyl, ethoxycarbonyl, n-propoxycarbonyl, isopropoxycarbonyl, n-butoxycarbonyl, tert-butoxycarbonyl, cyclohexyloxycarbonyl, tetrahydropyran-2-yloxycarbonyl, tetrahydrofuran-2-yloxycarbonyl, 1-ethoxyethoxycarbonyl or 1-butoxyethoxycarbonyl;

a carbonyl group;

an alkylcarbonyl group of 2 to 20 carbon atoms, such as methylcarbonyl, ethylcarbonyl, n-propylcarbonyl, isopropylcarbonyl, n-butylcarbonyl, tert-butylcarbonyl, cyclohexylcarbonyl, tetrahydropyran-2-ylcarbonyl or tetrahydrofuran-2-ylcarbonyl;

a cyano group;

a cyano group-containing alkyl group of 2 to 20 carbon atoms, such as cyanomethyl, cyanoethyl, cyanopropyl, cyanobutyl or cyanohexyl;

an ester group-containing alkyl group of 3 to 20 carbon atoms, such as carbomethoxymethyl, carboethoxymethyl, carbopropoxymethyl, carbobutoxymethyl, carbo(2-methylisopropoxy)methyl, carbobutoxyethyl, carbocyclopentoxymethyl, carbo(tetrahydropyran-2-yloxy)methyl or carbo(tetrahydrofuran-2-yloxy)methyl;

an ether group-containing alkyl group of 2 to 20 carbon atoms, such as methoxymethyl, ethoxymethyl, propoxymethyl, butoxymethyl, 2-methylisopropoxymethyl, butoxymethyl, 2,2-dimethyldioxolanmethyl, tetrahydropyran-2-yloxymethyl or tetrahydrofuran-2-yloxymethyl;

a hydroxycarbonyl group;

a carboxyl group-containing alkyl group of 2 to 20 carbon atoms, such as carboxymethyl, carboxyethyl or carboxypropyl;

a hydroxyl group;

a hydroxyl group-containing alkyl group of 1 to 20 carbon atoms, such as hydroxymethyl, hydroxyethyl, hydroxypropyl, hydroxybutyl, hydroxyhexyl, menthol or saccharide (e.g., glucose); and a chlorine-containing alkyl group of 1 to 20 carbon atoms, a bromine-containing alkyl group of 1 to 20 carbon atoms and an iodine-containing alkyl group of 1 to 20 carbon atoms, such as chloromethyl, bromomethyl, iodomethyl, dichloromethyl, dibromomethyl, diiodomethyl, trichloromethyl, tribromomethyl and triiodomethyl.

When $X^1$ is a group other than a fluorine-containing group, $R^a$ and $R^b$ are each, for example, hydrogen, chlorine, bromine, iodine or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, a chlorine-containing alkyl group of 1 to 20 carbon atoms, a bromine-containing alkyl group of 1 to 20 carbon atoms and an iodine-containing alkyl group of 1 to 20 carbon atoms. Examples of these groups include the same groups containing no fluorine as previously described with respect to $R^1$ to $R^{12}$. $X^1$ may be —O— or —S—.

When $X^1$ is a group other than a fluorine-containing group, $X^1$ is preferably —O— or —CH$_2$—.

When there are two or more groups other than fluorine or a fluorine-containing group as $R^1$ to $R^{12}$ and $X^1$, they may be the same or different.

At least two of $R^1$, $R^2$, $R^{11}$ and $R^{12}$ may be bonded to each other to form a cyclic structure.

n is 0 or an integer of 1 to 3, preferably 0 or 1.

The fluorine-containing cycloolefin polymer of the invention may be formed from only a repeated unit structure represented by the formula (1), or may contain a repeated unit structure other than the repeated unit structure represented by the formula (1).

In the fluorine-containing cycloolefin polymer of the invention, the total sum of the number of all fluorine atoms contained in $R^1$ to $R^{12}$ in the repeated unit structure represented by the formula (1) is preferably not less than 3.

If the total sum of the number of all fluorine atoms is 1 or 2, the shorter wavelength shift of the ultraviolet absorption wavelength due to the inductive effect of fluorine is not satisfactory. Therefore, the light transmission at 157 nm is not improved, and the absorption coefficient sometimes becomes higher than 3 $\mu$m$^{-1}$. The total sum of the number of all fluorine atoms is preferably in the range of 3 to 30.

The repeated unit structure other than the repeated unit structure represented by the formula (1) is, for example, a repeated unit structure derived from a cycloolefin containing or not containing fluorine, which is used together with the cycloolefin represented by the later-described formula (2) or (3) in the metathesis polymerization of at least one cycloolefin represented by the formula (2) or (3).

The fluorine-containing cycloolefin polymer of the invention is preferably a polymer consisting of only one kind of the unit structure represented by the formula (1), or is also preferably a polymer consisting of two or more kinds of the unit structures which are different in at least one of $R^1$ to $R^{12}$, $X^1$ and n in the formula (1), or is also preferably a polymer consisting of at least one kind of the unit structure wherein $X^1$ in the formula (1) is —CR$^a$R$^b$— and at least one kind of the unit structure wherein $X^1$ in the formula (1) is —O—, or is preferably a polymer consisting of the unit structure represented by the formula (1) and a unit structure derived from a fluorine-containing monocycloolefin.

When a thin film such as a pellicle membrane is bonded or press bonded to an aluminum frame, the fluorine-containing cycloolefin polymers consisting of two or more kinds of the unit structures which are different in at least one of $R^1$ to $R^{12}$, $X^1$ and n in the formula (1) and the fluorine-containing cycloolefin polymer consisting of at least one kind of the unit structure wherein $X^1$ in the formula (1) is —CR$^a$R$^b$— and at least one kind of the unit structure wherein $X^1$ in the formula (1) is —O— exhibit excellent adhesion to the metal frame. Further, when these polymers are applied onto a silicon wafer as photoresist and exposed to light, they exhibit excellent adhesion properties to the wafer. Moreover, the resolution of the photoresist or the solubility (developing properties) of the photoresist in an alkaline developing solution can be arbitrarily determined by changing the proportions between the above unit structures, and the properties of the resist can be appropriately selected. Especially for improving the bond properties, adhesion properties, and developing properties, $X^1$ is preferably —O—.

The repeated unit structure other than the repeated unit structure represented by the formula (1) may be contained in the fluorine-containing cycloolefin polymer in an amount of not more than 90% by mol, preferably not more than 30% by mol.

The fluorine-containing cycloolefin polymer of the invention has a weight-average molecular weight (Mw), as measured by gel permeation chromatography (GPC), of 500 to 1,000,000 in terms of polystyrene, preferably 3,000 to 500,000. The molecular weight distribution Mw/Mn of the polymer is in the range of preferably 1.0 to 3.0.

If the weight-average molecular weight Mw is less than 500, properties of the polymer are not exhibited, and the light resistance sometimes becomes poor. If the weight-average molecular weight is more than 1,000,000, bad influences due to lowering of flowability are sometimes exerted on the film-forming properties or the spin coating properties of a thin film, a coating material and a photoresist material. Likewise, if the molecular weight distribution Mw/Mn is more than 3.0, bad influences are sometimes exerted on the film-forming properties or the spin coating properties of a thin film such as pellicle membrane, a coating material and a photoresist material.

In the fluorine-containing cycloolefin polymer of the invention, the repeated unit structure represented by the formula (1) is preferably a repeated unit structure having a feature that the difference in the HOMO molecular orbital energy between a molecular model in which methyl group is bonded to each end of the unit structure and a molecular model which has the same carbon structure as the above molecular model but in which fluorine is replaced with hydrogen is in the range of 0.2 eV to 1.5 eV.

The term "HOMO" used herein means "Highest Occupied Molecular Orbital", and the difference in the HOMO energy is, for example, an energy difference calculated by the semiempirical orbital method (PM3 method) between a HOMO energy of a molecular model (chemical formula (1')) in which both ends of a repeated structural unit of the formula (1) wherein $R^2$ is CF$_3$, $X^1$ is CH$_2$, the others are each hydrogen, and n is 0 are capped with methyl groups in a hydrogenated polymer of a ring-opening metathesis polymer and a HOMO energy of a molecular model (chemical formula (1")) wherein fluorine in the molecular model of the chemical formula (1') is replaced with hydrogen.

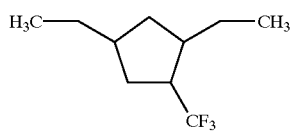
(1')

(Molecular model in which both ends of a repeated structural unit of the formula (1) wherein $R^2$ is $CF_3$, $X^1$ is $CH_2$, the others are each hydrogen, and n is 0 are capped with methyl groups in a hydrogenated polymer of a ring-opening metathesis polymer.)

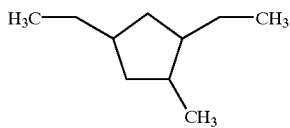
(1'')

(Molecular model in which both ends of a repeated structural unit of the formula (1) wherein $R^2$ is $CF_3$, $X^1$ is $CH_2$, the others are each hydrogen, and n is 0 are capped with methyl groups, and fluorine is replaced with hydrogen in a hydrogenated polymer of a ring-opening metathesis polymer.)

When the HOMO energy difference is in the range of 0.2 eV to 1.5 eV, the absorption coefficient of the fluorine-containing polymer at 157 nm of vacuum ultraviolet rays becomes not more than 3.0 $\mu m^{-1}$. The HOMO energy difference between the structural unit molecular models can well express the degree of the absorption coefficient.

The absorption coefficient of the fluorine-containing cycloolefin polymer of the invention at 157 nm of vacuum ultraviolet rays is not more than 3.0 $\mu m^{-1}$. If the absorption coefficient at this wavelength exceeds 3.0 $\mu m^{-1}$, the polymer is deteriorated by the absorption energy of the light to cause lowering of light resistance of the resist or to cause marked light energy loss when used for a pellicle membrane etc., and thereby troubles may occur in the semiconductor production. Further, because of light energy loss caused by the light energy absorption, a light quantity capable of forming an extremely fine pattern in the production of semiconductor or the like cannot be attained, and thereby a problem that the polymer cannot apply to the lithographic processing using vacuum ultraviolet rays may occur.

In the present invention, the absorption coefficient is represented by the following common logarithmic equation.

Absorption coefficient $(\mu m^{-1}) = \text{Log}_{10}[T_0/T_s]/t_s$ (1)

In the equation (1), the unit of the absorption coefficient is expressed in a reciprocal number of the thickness $\mu$m of a film or a spin-coating film formed on a $CaF_2$ substrate, and $T_o$ is a transmittance of a blank, that is to say, when the sample is a film, $T_o$ is a transmittance in the measuring atmosphere, and when the sample is a spin-coating film formed on a $CaF_2$ substrate, $T_o$ is a transmittance of the uncoated substrate, namely, a transmittance measured before the coating. $T_s$ is a transmittance of the sample film or the sample applied onto the $CaF_2$ substrate. These transmittances can be measured by a vacuum ultraviolet spectroscope. $t_s$ is a thickness of the sample film or the sample applied onto the $CaF_2$ substrate, and is expressed in $\mu$m.

The fluorine-containing cycloolefin polymer of the invention has excellent light transmission over a wide range of visible region to vacuum ultraviolet region and has a low light refractive index. The refractive index in the visible region is not more than 1.50.

The light transmittance of the fluorine-containing cycloolefin polymer in the visible region is in the range of 95 to 100%, and the light transmittance in the region of ultraviolet rays from KrF excimer laser or ArF excimer laser is high and in the range of 80 to 100%.

The glass transition temperature (Tg) that is an indication of thermal resistance of a polymer depends upon structure or molecular weight of the polymer, and it is possible to design a fluorine-containing cycloolefin polymer having Tg of not lower than 100° C. Owing to its optical properties and thermal properties, the polymer having high Tg can be used for optical parts. Further, designing of the cycloolefin polymer structure makes it possible to impart chemical resistance and water resistance to the fluorine-containing cycloolefin polymer.

The fluorine-containing cycloolefin polymer having at least a repeated unit structure represented formula (I) of the invention is prepared by, for example, a process comprising subjecting at least one cycloolefin monomer represented by the formula (2) or (3) to ring-opening metathesis polymerization and then subjecting the obtained ring-opening metathesis polymer to at least one of hydrogenation, hydrogen fluoride addition and fluorine addition.

Next, the cycloolefin monomer preferably used for the synthesis of the fluorine-containing cycloolefin polymer of the invention is described.

Cycloolefin Monomer

The cycloolefin monomer of the fluorine-containing cyclolefin polymer of the invention is represented by the following formula (2) or (3).

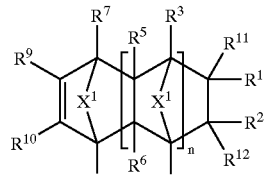
(2)

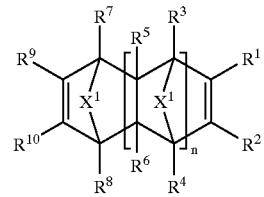
(3)

In the formula (2), at least one of $R^1$ to $R^{12}$ and $X^1$ is fluorine or a fluorine-containing group, and in the formula (3), at least one of $R^1$ to $R^{10}$ and $X^1$ is fluorine or a fluorine-containing group.

When at least one of $R^1$ to $R^{12}$ in the formula (2) and at least one of $R^1$ to $R^{10}$ in the formula (3) are each fluorine or a fluorine-containing group, $R^1$ to $R^{12}$ and $R^1$ to $R^{10}$ are each, for example, fluorine or a fluorine-containing group selected from a fluorine-containing alkyl group of 1 to 20 carbon atoms, a fluorine-containing aryl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms. Examples of these groups include the same fluorine-containing groups as previously described with respect to $R^1$ to $R^{12}$ in the formula (1).

When at least one $X^1$ in the formulas (2) and (3) is a fluorine-containing group, $X^1$ is selected from fluorine-containing groups, such as —$CR^aR^b$—, —$NR^a$— and —$PR^a$—.

At least one of $R^a$ and $R^b$ in —$CR^aR^b$— and $R^a$ in —$NR^a$— and —$PR^a$— are each selected from fluorine, a fluorine-containing alkyl group of 1 to 20 carbon atoms, a fluorine-containing and silicon-containing alkyl group of 1 to 20 carbon atoms, a fluorine-containing alkoxy group, a fluorine-containing and ether group-containing alkyl group of 1 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms. Examples of these groups include the same fluorine-containing groups as previously described with respect to $R^1$ to $R^{12}$ in the formula (1).

When two or more of $R^1$ to $R^{12}$ in the formula (2) are each fluorine or a fluorine-containing group, they may be the same or different, and when two or more of $X^1$ in the formula (2) are each a fluorine-containing group, they may be the same or different. When two or more of $R^1$ to $R^{10}$ in the formula (3) are each fluorine or a fluorine-containing group, they may be the same or different, and when two or more of $X^1$ in the formula (3) are each a fluorine-containing group, they may be the same or different.

$R^1$ to $R^{12}$ other than $R^1$ to $R^{12}$ which are each fluorine or a fluorine-containing group in the formula (2) and $R^1$ to $R^{10}$ other than $R^1$ to $R^{10}$ which are each fluorine or a fluorine-containing group in the formula (3) are each selected from, for example, hydrogen, an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms. Examples of these groups include the same groups containing no fluorine as previously described with respect to $R^1$ to $R^{12}$ in the formula (1).

When $X^1$ is a group other than a fluorine-containing group in the formulas (2) and (3), $R^a$ and $R^b$ are each selected from, for example, hydrogen, chlorine, bromine, iodine, an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, a chlorine-containing alkyl group of 1 to 20 carbon atoms, a bromine-containing alkyl group of 1 to 20 carbon atoms and an iodine-containing alkyl group of 1 to 20 carbon atoms. Examples of these groups include the same groups containing no fluorine as previously described with respect to $R^1$ to $R^{12}$ in the formula (1).

$X^1$ may be selected from —O— and —S—.

n is 0 or an integer of 1 to 3.

When $X^1$ is a group other than a fluorine-containing group, $X^1$ is preferably —O— or —$CH_2$—.

When there are two or more groups other than fluorine or a fluorine-containing group as $R^1$ to $R^{12}$ in the formula (2), they may be the same or different, and when there are two or more groups other than fluorine or a fluorine-containing group as $X^1$ in the formula (2), they may be the same or different. When there are two or more groups other than fluorine or a fluorine-containing group as $R^1$ to $R^{10}$ in the formula (3), they may be the same or different, and when there are two or more groups other than fluorine or a fluorine-containing group as $X^1$ in the formula (3), they may be the same or different.

In the formula (2), $R^1$, $R^2$, $R^{11}$ and $R^{12}$ may be bonded to each other to form a cyclic structure, and in the formula (3), $R^1$ and $R^2$ may be bonded to each other to form a cyclic structure.

Examples of the cycloolefin monomers represented by the formula (2) include 5-trifluoromethylbicyclo[2.2.1]hept-2-ene, 5-trifluoromethyl-7-oxobicyclo[2.2.1]hept-2-ene, 5,6-difluoro-5,6-bistrifluoromethylbicyclo[2.2.1]hept-2-ene, 5,6-difluoro-5-trifluoromethyl-6-pentafluorobicyclo[2.2.1]hept-2-ene, 5-fluoro-5-pentafluoroethyl-6,6-bistrifluoromethylbicyclo[2.2.1]hept-2-ene, 5,6-difluoro-5-trifluoromethyl-6-heptafluoroisopropylbicyclo[2.2.1]hept-2-ene, 5,6,6,7,7,8,8,9-octafluorotricyclo[5.2.1.0$^{5,9}$]deca-2-ene and 5,6-bis(nonafluorobutyl)bicyclo[2.2.1]hept-2-ene.

For example, there can be mentioned the following structures.

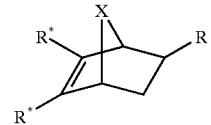

wherein

X is $CH_2$, $CF_2$, $C(CF_3)_2$, O or S,

R is F, $CF_3$, $CF_2CF_3$, $C_3C_7$, $C_4C_9$, $CF(CF_3)_2$, $C(CF_3)_3$, $C_6F_{11}$, $C_6F_5$, $Si(CF_3)_3$, $OCF_3$, $COOCF_3$, $COOCCH_3(CF_3)_2$, $COOC(CF_3)_3$, $COOC_2F_5(C_5H_8)$, $CF_2OCF_3$, $CF_2OH$, $CF_2OCOCF_3$, $CF_2COOH$ or $CF_2CN$,

R* is H, R, $CH_3$, $C(CH_3)_3$, $Si(CH_3)_3$, $OCH_3$, $CH_2OH$, $COOCH_3$, $COOC(CH_3)_3$, $COOC_2H_5(C_5H_8)$, $CH_2OCH_3$, $CH_2OCOCH_3$, COOH, CN, OH or Br, and

17

R and R* are independent from each other.

wherein

X is CH₂, CF₂, C(CF₃)₂, O or S,

R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃ (CF₃)₂, COOC(CF₃)₃, COOC₂F₅(C₅H₈), CF₂OCF₃, CF₂OH, CF₂OCOCF₃, CF₂COOH or CF₂CN,

R' is R, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br,

R* is H or R', and

R, R' and R* are independent from one another.

wherein

X is CH₂, CF₂, C(CF₃)₂, O or S,

R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃ (CF₃)₂, COOC(CF₃)₃, COOC₂F₅(C₅H₈), CF₂OCF₃, CF₂OH, CF₂OCOCF₃, CF₂COOH or CF₂CN,

R' is R, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br,

R* is H or R', and

R, R' and R* are independent from one another.

wherein

X is CH₂, CF₂, C(CF₃)₂, O or S,

R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃ (CF₃)₂, COOC(CF₃)₃, COOC₂F₅(C₅H₈), CF₂OCF₃, CF₂OH, CF₂OCOCF₃, CF₂COOH or CF₂CN,

R' is R, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br,

R" is R',

R* is H or R', and

18

R, R', R" and R* are independent from one another.

wherein

X is CH₂, CF₂, C(CF₃)₂, O or S.

R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃ (CF₃)₂, COOC(CF₃)₃, COOC₂F₅(C₅H₈), CF₂OCF₃, CF₂OH, CF₂OCOCF₃, CF₂COOH or CF₂CN,

R' is R, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br,

R" is R',

R''' is R',

R* is H or R', and

R, R', R", R''' and R* are independent from one another.

wherein

X is CH₂, CF₂, C(CF₃)₂, O or S,

R is CF₂, CFCF, CHCF₃, C(CF₃)₂, (CF₂)₂, (CF₂)₃, CHC₆F₅, Si(CF₃)₂, CF₂OCF₂, CFOH, COCF₂, CFCOOCF₂, CFCOOH or CFCN,

R' is R, CH₂, (CH₂)₂, (CH₂)₃, Si(CH₃)₂, CH₂OCH₂, CHOH, COOCH₂, CHCOOH, CO, CHOCH₃, O or CHOCHOCH₃,

R* is H, F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃ (CF₃)₂, COOC(CF₃)₃, COOC₂F₅(C₅H₈), CF₂OCF₃, CF₂OH, CF₂OCOCF₃, CF₂COOH, CF₂CN, CH₃, C(CH₃)₃, Si(CH₃)₃, OCH₃, CH₂OH, COOCH₃, COOC (CH₃)₃, COOC₂H₅(C₅H₈), CH₂OCH₃, CH₂OCOCH₃, COOH, CN, OH or Br, and R, R' and R* are independent from one another.

wherein

X is CH₂, CF₂, C(CF₃)₂, O or S,

R is CF₂, CFCF, CHCF₃, C(CF₃)₂, (CF₂)₂, (CF₂)₃, CHC₆F₅, Si(CF₃)₂, CF₂OCF₂, CFOH, COCF₂, CFCOOCF₂, CFCOOH, CFCN, CH₂, (CH₂)₂, (CH₂)₃, Si(CH₃)₂, CH₂OCH₂, CHOH, COOCH₂, CHCOOH, CO, CHOCH₃ or CHOCHOCH₃,

R' is R,

R" is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃ (CF₃)₂, COOC(CF₃)₃, COOC₂F₅(C₅H₈), CF₂OCF₃,

CF$_2$OH, CF$_2$OCOCF$_3$, CF$_2$COOH, CF$_2$CN, CH$_3$, C(CH$_3$)$_3$, Si(CH$_3$)$_3$, OCH$_3$, CH$_2$OH, COOCH$_3$, COOC(CH$_3$)$_3$, COOC$_2$H$_5$(C$_5$H$_8$), CH$_2$OCH$_3$, CH$_2$OCOCH$_3$, COOH, CN, OH or Br,

R''' is R'',

R* is H or R'', and

R, R', R'', R''' and R* are independent from one another.

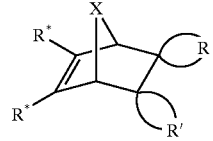

wherein

X is CH$_2$, CF$_2$, C(CF$_3$)$_2$, O or S,

R is (CF$_2$)$_2$, (CF$_2$)$_3$, (CF$_2$)$_4$, (CF$_2$)$_5$ or (CF$_2$)$_6$,

R' is R, CH$_2$, (CH$_2$)$_2$, (CH$_2$)$_3$, (CH$_2$)$_4$, (CH$_2$)$_5$ or (CH$_2$)$_6$,

R* is H or R', and

R, R' and R* are independent from one another.

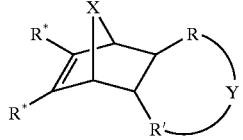

wherein

X is CH$_2$, CF$_2$, C(CF$_3$)$_2$, O or S,

Y is O, CO, NCF$_3$, NCH$_3$ or NC$_6$F$_5$,

R is CF$_2$, CFCF, CHCF$_3$, C(CF$_3$)$_2$, (CF$_2$)$_2$, (CF$_2$)$_3$, CHC$_6$F$_5$, Si(CF$_3$)$_2$, CF$_2$OCF$_2$, CFOH, COCF$_2$, CFCOOCF$_2$, CFCOOH or CFCN,

R' is R, CH$_2$, (CH$_2$)$_2$, (CH$_2$)$_3$, Si(CH$_3$)$_2$, CH$_2$OCH$_2$, CHOH, COOCH$_2$, CHCOOH, CO, CHOCH$_3$, O or CHOCHOCH$_3$,

R* is H, F, CF$_3$, CF$_2$CF$_3$, C$_3$F$_7$, C$_4$F$_9$, CF(CF$_3$)$_2$, C(CF$_3$)$_3$, C$_6$F$_{11}$, C$_6$F$_5$, Si(CF$_3$)$_3$, OCF$_3$, COOCF$_3$, COOCCH$_3$(CF$_3$)$_2$, COOC(CF$_3$)$_3$, COOC$_2$F$_5$(C$_5$H$_8$), CF$_2$OCF$_3$, CF$_2$OH, CF$_2$OCOCF$_3$, CF$_2$COOH, CF$_2$CN, CH$_3$, C(CH$_3$)$_3$, Si(CH$_3$)$_3$, OCH$_3$, CH$_2$OH, COOCH$_3$, COOC(CH$_3$)$_3$, COOC$_2$H$_5$(C$_5$H$_8$), CH$_2$OCH$_3$, CH$_2$OCOCH$_3$, COOH, CN, OH or Br, and R, R' and R* are independent from one another.

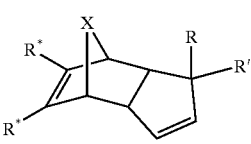

wherein

X is CH$_2$, CF$_2$, C(CF$_3$)$_2$, O or S,

R is F, CF$_3$, CF$_2$CF$_3$, C$_3$F$_7$, C$_4$F$_9$, CF(CF$_3$)$_2$, C(CF$_3$)$_3$, C$_6$F$_{11}$, C$_6$F$_5$, Si(CF$_3$)$_3$, OCF$_3$, COOCF$_3$, COOCCH$_3$(CF$_3$)$_2$, COOC(CF$_3$)$_3$, COOC$_2$F$_5$(C$_5$H$_8$), CF$_2$OCF$_3$, CF$_2$OH, CF$_2$OCOCF$_3$, CF$_2$COOH or CF$_2$CN,

R' is R, CH$_3$, C(CH$_3$)$_3$, Si(CH$_3$)$_3$, OCH$_3$, CH$_2$OH, COOCH$_3$, COOC(CH$_3$)$_3$, COOC$_2$H$_5$(C$_5$H$_8$), CH$_2$OCH$_3$, CH$_2$OCOCH$_3$, COOH, CN, OH or Br,

R* is H or R', and

R, R' and R* are independent from one another.

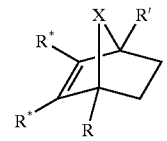

wherein

X is CH$_2$, CF$_2$, C(CF$_3$)$_2$, O or S,

R is F, CF$_3$, CF$_2$CF$_3$, C$_3$F$_7$, C$_4$F$_9$, CF(CF$_3$)$_2$, C(CF$_3$)$_3$, C$_6$F$_{11}$, C$_6$F$_5$, Si(CF$_3$)$_3$, OCF$_3$, COOCF$_3$, COOCCH$_3$(CF$_3$)$_2$, COOC(CF$_3$)$_3$, COOC$_2$F$_5$(C$_5$H$_8$), CF$_2$OCF$_3$, CF$_2$OH, CF$_2$OCOCF$_3$, CF$_2$COOH or CF$_2$CN,

R' is R, CH$_3$, C(CH$_3$)$_3$, Si(CH$_3$)$_3$, OCH$_3$, CH$_2$OH, COOCH$_3$, COOC(CH$_3$)$_3$, COOC$_2$H$_5$(C$_5$H$_8$), CH$_2$OCH$_3$, CH$_2$OCOCH$_3$, COOH, CN, OH or Br,

R* is H or R', and

R, R' and R* are independent from one another.

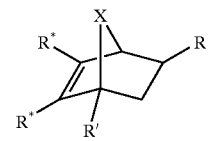

wherein

X is CH$_2$, CF$_2$, C(CF$_3$)$_2$, O or S,

R is F, CF$_3$, CF$_2$CF$_3$, C$_3$F$_7$, C$_4$F$_9$, CF(CF$_3$)$_2$, C(CF$_3$)$_3$, C$_6$F$_{11}$, C$_6$F$_5$, Si(CF$_3$)$_3$, OCF$_3$, COOCF$_3$, COOCCH$_3$(CF$_3$)$_2$, COOC(CF$_3$)$_3$, COOC$_2$F$_5$(C$_5$H$_8$), CF$_2$OCF$_3$, CF$_2$OH, CF$_2$OCOCF$_3$, CF$_2$COOH or CF$_2$CN,

R' is R, CH$_3$, C(CH$_3$)$_3$, Si(CH$_3$)$_3$, OCH$_3$, CH$_2$OH, COOCH$_3$, COOC(CH$_3$)$_3$, COOC$_2$H$_5$(C$_5$H$_8$), CH$_2$OCH$_3$, CH$_2$OCOCH$_3$, COOH, CN, OH or Br,

R* is H or R', and

R, R' and R* are independent from one another.

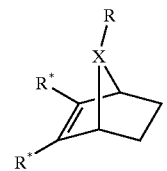

wherein

X is N or P,

R is F, CF$_3$, CF$_2$CF$_3$, C$_3$F$_7$, C$_4$F$_9$, CF(CF$_3$)$_2$, C(CF$_3$)$_3$, C$_6$F$_{11}$, C$_6$F$_5$, Si(CF$_3$)$_3$, OCF$_3$, COOCF$_3$, COOCCH$_3$(CF$_3$)$_2$, COOC(CF$_3$)$_3$, COOC$_2$F$_5$(C$_5$H$_8$), CF$_2$OCF$_3$, CF$_2$OH, CF$_2$OCOCF$_3$, CF$_2$COOH or CF$_2$CN,

R' is H, R, CH$_3$, C(CH$_3$)$_3$, Si(CH$_3$)$_3$, OCH$_3$, CH$_2$OH, COOCH$_3$, COOC(CH$_3$)$_3$, COOC$_2$H$_5$(C$_5$H$_8$), CH$_2$OCH$_3$, CH$_2$OCOCH$_3$, COOH, CN, OH or Br, and R and R* are independent from each other.

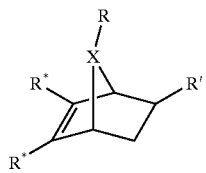

wherein

X is N or P,

R is F, $CF_3$, $CF_2CF_3$, $C_3F_7$, $C_4F_9$, $CF(CF_3)_2$, $C(CF_3)_3$, $C_6F_{11}$, $C_6F_5$, $Si(CF_3)_3$, $OCF_3$, $COOCF_3$, $COOCCH_3(CF_3)_2$, $COOC(CF_3)_3$, $COOC_2F_5(C_5H_8)$, $CF_2OCF_3$, $CF_2OH$, $CF_2OCOCF_3$, $CF_2COOH$, $CF_2CN$, $CH_3$, $C(CH_3)_3$, $Si(CH_3)_3$, $OCH_3$, $CH_2OH$, $COOCH_3$, $COOC(CH_3)_3$, $COOC_2H_5(C_5H_8)$, $CH_2OCH_3$, $CH_2OCOCH_3$, COOH, CN, OH or Br,

R' is R,

R* is H or R', and

R, R' and R* are independent from one another.

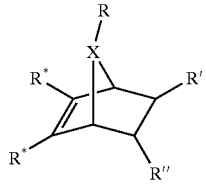

wherein

X is N or P,

R is F, $CF_3$, $CF_2CF_3$, $C_3F_7$, $C_4F_9$, $CF(CF_3)_2$, $C(CF_3)_3$, $C_6F_{11}$, $C_6F_5$, $Si(CF_3)_3$, $OCF_3$, $COOCF_3$, $COOCCH_3(CF_3)_2$, $COOC(CF_3)_3$, $COOC_2F_5(C_5H_8)$, $CF_2OCF_3$, $CF_2OH$, $CF_2OCOCF_3$, $CF_2COOH$, $CF_2CN$, $CH_3$, $C(CH_3)_3$, $Si(CH_3)_3$, $OCH_3$, $CH_2OH$, $COOCH_3$, $COOC(CH_3)_3$, $COOC_2H_5(C_5H_8)$, $CH_2OCH_3$, $CH_2OCOCH_3$, COOH, CN, OH or Br,

R' is R,

R" is R',

R* is H or R', and

R, R', R" and R* are independent from one another.

Also available are a derivative of tetracyclo [4.4.0.1$^{2.5}$.1$^{7.10}$]-3-dodecene structure of the formula (2) wherein n is 1, a derivative of hexacyclo [6.6.1.1$^{3.6}$.1$^{10.13}$.0$^{2.7}$.0$^{9.14}$]-4-heptadecene structure of the formula (2) wherein n is 2, and a derivative of octacyclo [8.8.0.1$^{2.9}$.1$^{4.7}$.1$^{11.18}$.1$^{13.16}$.0$^{3.8}$.0$^{12.17}$]-5-docosene structure of the formula (2) wherein n is 3, each of which has the same substituents as those of the above-exemplified derivative of bicyclo[2.2.1]hept-2-ene structure of the formula (2) wherein n is 0.

Examples of the cycloolefin monomers represented by the formula (3) include 5,6-bistrifluoromethylbicyclo[2.2.1] hepta-2,5-diene, perfluorobicyclo[2.2.1]hepta-2,5-diene and 5,6-bistrifluoromethyl-7-oxobicyclo[2.2.1]hepta-2,5-diene.

For example, there can be mentioned the following structures.

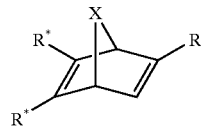

wherein

X is $CH_2$, $CF_2$, $C(CF_3)_2$, O or S,

R is F, $CF_3$, $CF_2CF_3$, $C_3F_7$, $C_4F_9$, $CF(CF_3)_2$, $C(CF_3)_3$, $C_6F_{11}$, $C_6F_5$, $Si(CF_3)_3$, $OCF_3$, $COOCF_3$, $COOCCH_3(CF_3)_2$, $COOC(CF_3)_3$, $COOC_2F_5(C_5H_8)$, $CF_2OCF_3$, $CF_2OH$, $CF_2OCOCF_3$, $CF_2COOH$ or $CF_2CN$,

R* is H, R, $CH_3$, $C(CH_3)_3$, $Si(CH_3)_3$, $OCH_3$, $CH_2OH$, $COOCH_3$, $COOC(CH_3)_3$, $COOC_2H_5(C_5H_8)$, $CH_2OCH_3$, $CH_2OCOCH_3$, COOH, CN, OH or Br, and R and R* are independent from each other.

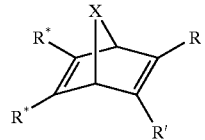

wherein

X is $CH_2$, $CF_2$, $C(CF_3)_2$, O or S,

R is F, $CF_3$, $CF_2CF_3$, $C_3F_7$, $C_4F_9$, $CF(CF_3)_2$, $C(CF_3)_3$, $C_6F_{11}$, $C_6F_5$, $Si(CF_3)_3$, $OCF_3$, $COOCF_3$, $COOCCH_3(CF_3)_2$, $COOC(CF_3)_3$, $COOC_2F_5(C_5H_8)$, $CF_2OCF_3$, $CF_2OH$, $CF_2OCOCF_3$, $CF_2COOH$ or $CF_2CN$,

R' is R, $CH_3$, $C(CH_3)_3$, $Si(CH_3)_3$, $OCH_3$, $CH_2OH$, $COOCH_3$, $COOC(CH_3)_3$, $COOC_2H_5(C_5H_8)$, $CH_2OCH_3$, $CH_2OCOCH_3$, COOH, CN, OH or Br,

R* is H or R', and

R, R' and R* are independent from one another.

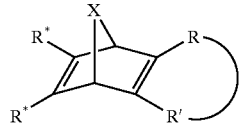

wherein

X is $CH_2$, $CF_2$, $C(CF_3)_2$, O or S,

R is $CF_2$, CFCF, $CHCF_3$, $C(CF_3)_2$, $(CF_2)_2$, $(CF_2)_3$, $CHC_6F_5$, $Si(CF_3)_2$, $CF_2OCF_2$, CFOH, $COCF_2$, $CFCOOCF_2$, CFCOOH or CFCN,

R' is R, $CH_2$, $(CH_2)_2$, $(CH_2)_3$, $Si(CH_3)_2$, $CH_2OCH_2$, CHOH, $COOCH_2$, CHCOOH, CO, $CHOCH_3$, O or $CHOCOCH_3$,

R* is H, F, $CF_3$, $CF_2CF_3$, $C_3F_7$, $C_4F_9$, $CF(CF_3)_2$, $C(CF_3)_3$, $C_6F_{11}$, $C_6F_5$, $Si(CF_3)_3$, $OCF_3$, $COOCF_3$, $COOCCH_3(CF_3)_2$, $COOC(CF_3)_3$, $COOC_2F_5(C_5H_8)$, $CF_2OCF_3$, $CF_2OH$, $CF_2OCOCF_3$, $CF_2COOH$, $CF_2CN$, $CH_3$, $C(CH_3)_3$, $Si(CH_3)_3$, $OCH_3$, $CH_2OH$, $COOCH_3$, $COOC(CH_3)_3$, $COOC_2H_5(C_5H_8)$, $CH_2OCH_3$, $CH_2OCOCH_3$, COOH, CN, OH or Br, and R, R' and R* are independent from one another.

wherein

X is CH₂, CF₂, C(CF₃)₂, O or S,
Y is O, CO, NCF₃, NCH₃ or NC₆F₅,
R is CF₂, CFCF, CHCF₃, C(CF₃)₂, (CF₂)₂, (CF₂)₃, CHC₆F₅, Si(CF₃)₂, CF₂OCF₂, CFOH, COCF₂, CFCOOCF₂, CFCOOH or CFCN,
R' is R, CH₂, (CH₂)₂, (CH₂)₃, Si(CH₃)₂, CH₂OCH₂, CHOH, COOCH₂, CHCOOH, CO, CHOCH₃, O or CHOCOCH₃,
R* is H, F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃(CF₃)₂, COOC(CF₃)₃, COOC₂F₅(C₅H₈), CF₂OCF₃, CF₂OH, CF₂OCOCF₃, CF₂COOH, CF₂CN, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br, and R, R' and R* are independent from one another.

wherein

X is CH₂, CF₂, C(CF₃)₂, O or S,
R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃(CF₃)₂, COOC(CF₃)₃, COOC₂F₅ (C₅H₈), CF₂OCF₃, CF₂OH, CF₂OCOCF₃, CF₂COOH or CF₂CN,
R' is R, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br,
R* is H or R', and R, R' and R* are independent from one another.

wherein

X is CH₂, CF₂, C(CF₃)₂, O or S,
R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃(CF₃)₂, COOC(CF₃)₃, COOC₂F₅(C₅H₈), CF₂OCF₃, CF₂OH, CF₂OCOCF₃, CF₂COOH or CF₂CN,
R' is R, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br,
R* is H or R', and R, R' and R* are independent from one another.

wherein

X is CH₂, CF₂, C(CF₃)₂, O or S,
R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃(CF₃)₂, COOC(CF₃)₃, COOC₂F₅(C₅H₈), CF₂OCF₃, CF₂OH, CF₂OCOCF₃, CF₂COOH or CF₂CN,
R' is H, R, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br, and R and R* are independent from each other.

wherein

X is N or P,
R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃(CF₃)₂, COOC(CF₃)₃, COOC₂F₅(C₅H₈), CF₂OCF₃, CF₂OH, CF₂OCOCF₃, CF₂COOH or CF₂CN,
R' is H, R, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br, and R and R* are independent from each other.

wherein

X is N or P,
R is F, CF₃, CF₂CF₃, C₃F₇, C₄F₉, CF(CF₃)₂, C(CF₃)₃, C₆F₁₁, C₆F₅, Si(CF₃)₃, OCF₃, COOCF₃, COOCCH₃(CF₃)₂, COOC(CF₃)₃, COOC₂F₅(C₅H₈), CF₂OCF₃, CF₂OH, CF₂OCOCF₃, CF₂COOH, CF₂CN, CH₃, C(CH₃)₃, Si(CH₃)₃, OCH₃, CH₂OH, COOCH₃, COOC(CH₃)₃, COOC₂H₅(C₅H₈), CH₂OCH₃, CH₂OCOCH₃, COOH, CN, OH or Br,
R' is R,
R* is H or R', and R, R' and R* are independent from one another.

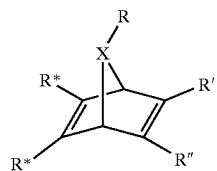

wherein

X is N or P,

R is F, $CF_3$, $CF_2CF_3$, $C_3F_7$, $C_4F_9$, $CF(CF_3)_2$, $C(CF_3)_3$, $C_6F_{11}$, $C_6F_5$, $Si(CF_3)_3$, $OCF_3$, $COOCF_3$, $COOCCH_3(CF_3)_2$, $COOC(CF_3)_3$, $COOC_2F_5(C_5H_8)$, $CF_2OCF_3$, $CF_2OH$, $CF_2OCOCF_3$, $CF_2COOH$, $CF_2CN$, $CH_3$, $C(CH_3)_3$, $Si(CH_3)_3$, $OCH_3$, $CH_2OH$, $COOCH_3$, $COOC(CH_3)_3$, $COOC_2H_5(C_5H_8)$, $CH_2OCH_3$, $CH_2OCOCH_3$, COOH, CN, OH or Br,

R' is R,

R" is R',

R* is H or R', and

R, R', R" and R* are independent from one another.

Also available are a derivative of tetracyclo[4.4.0.1$^{2.5}$.1$^{7.10}$]dodeca-3,8-diene structure of the formula (3) wherein n is 1, a derivative of hexacyclo[6.6.1.1$^{3.6}$.1$^{10.13}$.0$^{2.7}$.0$^{9.14}$]heptadeca-4,11-diene structure of the formula (3) wherein n is 2, and a derivative of octacyclo[8.8.0.1$^{2.9}$.1$^{4.7}$.1$^{11.18}$.1$^{13.16}$.0$^{3.8}$.0$^{12.17}$]doco-5,14-diene structure of the formula (3) wherein n is 3, each of which has the same substituents as those of the above-exemplified derivative of bicyclo[2.2.1]hepta-2,5-diene structure of the formula (3) wherein n is 0.

As examples of the cycloolefin monomers represented by the formula (2) or (3), there can be further mentioned a fluorine-containing bicycloheptene derivative such as perfluorobicyclo[2.2.1]hept-2-ene, a fluorine-containing bicycloheptadiene derivative such as perfluorobicyclo[2.2.1]hepta-2,5-diene, and a fluorine-containing tetracyclododecene derivative such as perfluorotetracyclo[4.4.0.1$^{2.5}$.1$^{7.10}$]-3-dodecene.

In the cycloolefin monomer, the total sum of the number of all, fluorine atoms contained in $R^1$ to $R^{12}$ in the formula (2) and the total sum of the number of all fluorine atoms contained in $R^1$ to $R^{10}$ in the formula (3) are each preferably not less than 3.

The cycloolefin monomers represented by the formula (2) or (3) can be synthesized by subjecting fluorine-containing olefins as dienophiles to addition reaction with cyclopentadienes, furans, thiophenes, pyrroles, etc. by the publicly known Diels-Alder reaction.

The cycloolefin monomers can also be synthesized by other processes, such as a process wherein bicycloolefins having polar group, such as alcohols, carboxylic acids, esters, ketones, aldehydes, ethers and amides, or cycloolefins, such as bicyclodienes, tetracycloolefins, tetracyclodienes, octacycloolefins and octacyclodienes, are fluorinated using fluorinating agents such as sulfur tetrafluoride and DAST to introduce fluorine into cycloolefins, and a process wherein alcohol compounds containing fluorine, carboxylic acid compounds containing fluorine, silicon compounds containing fluorine, halogenated (e.g., brominated or iodinated) hydrocarbon compounds containing fluorine, etc. are subjected to known coupling reaction, condensation reaction or addition reaction to introduce fluorine into cycloolefins.

Process for Preparing Fluorine-Containing Cycloolefin Polymer

The fluorine-containing cycloolefin polymer of the invention having at least a repeated unit structure represented by the formula (1) is prepared by a process comprising subjecting at least one cycloolefin monomer represented by the formula (2) or (3) to ring-opening metathesis polymerization and then subjecting the resulting polymer to at least one of hydrogenation, hydrogen fluoride addition and fluorine addition.

In the present invention, two or more cylcoolefin monomers represented by the formula (2) or (3) and different in at least one of $R^1$ to $R^{12}$, $R^1$ to $R^{10}$, $X^1$ and n may be subjected to ring-opening metathesis polymerization, or at least one cycloolefin monomer wherein $X^1$ in the formula (2) or (3) is —$CR^aR^b$— and at least one cycloolefin monomer wherein $X^1$ in the formula (2) or (3) is —O— may be copolymerized.

In the ring-opening metathesis polymerization of at least one cycloolefin monomer represented by the formula (2) or (3) in the present invention, the cycloolefin monomer represented by the formula (2) or (3) may be copolymerized with:

polycyclic cycloolefins containing no fluorine, e.g., bicycloheptene derivatives, such as bicyclo[2.2.1]hept-2-ene, 5-methylbicyclo[2.2.1]hept-2-ene, 5-ethylbicyclo[2.2.1]hept-2-ene, 5-chlorobicyclo[2.2.1]hept-2-ene, 5-bromobicyclo[2.2.1]hept-2-ene and 5-methyl-6-methylbicyclo[2.2.1]hept-2-ene; bicycloheptadiene derivatives, such as bicyclo[2.2.1]hepta-2,5-diene, 5-methylbicyclo[2.2.1]hepta-2,5-diene, 5-ethylbicyclo[2.2.1]hepta-2,5-diene, 5-chlorobicyclo[2.2.1]hepta-2,5-diene, 5-bromobicyclo[2.2.1]hepta-2,5-diene and 5-methyl-6-methylbicyclo[2.2.1]hepta-2,5-diene; tetracyclododecene derivatives, such as tetracyclo[4.4.0.1$^{2.5}$.1$^{7.10}$]-3-dodecene, 8-methyltetracyclo[4.4.0.1$^{2.5}$.1$^{7.10}$]-3-dodecene, 8-ethyltetracyclo[4.4.0.1$^{2.5}$.1$^{7.10}$]-3-dodecene, 8-chlorotetracyclo[4.4.0.1$^{2.5}$.1$^{7.10}$]-3-dodecene, 8-bromotetracyclo[4.4.0.1$^{2.5}$.1$^{7.10}$]-3-dodecene and 8-methyl-9-methyltetracyclo[4.4.0.1$^{2.5}$.1$^{7.10}$]-3-dodecene; hexacycloheptadecene derivatives, such as hexacyclo[6.6.1.1$^{3.6}$.1$^{10.13}$.0$^{2.7}$.0$^{9.14}$]-4-heptadecene, 11-methylhexacyclo[6.6.1.1$^{3.6}$.1$^{10.13}$.0$^{2.7}$.0$^{9.14}$]-4-heptadecene and 11-ethylhexacyclo[6.6.1.1$^{3.6}$.1$^{10.13}$.0$^{2.7}$.0$^{9.14}$]-4-heptadecene; and octacyclodocosene derivatives, such as octacyclo[8.8.0.1$^{2.9}$.1$^{4.7}$.1$^{11.18}$.1$^{13.16}$.0$^{3.8}$.0$^{12.17}$]-5-docosene, 14-methyloctacyclo[8.8.0.1$^{2.9}$.1$^{4.7}$.1$^{11.18}$.1$^{13.16}$.0$^{3.8}$.0$^{12.17}$]-5-docosene and 14-ethyloctacyclo[8.8.0.1$^{2.9}$.1$^{4.7}$.1$^{11.18}$.1$^{13.16}$.0$^{3.8}$.0$^{12.17}$]-5-docosene; and monocyclic cyloolefins containing or not containing fluorine, e.g., cyclobutene, fluorine-containing cyclobutene such as perfluorocyclobutene; cyclopentene, fluorine-containing cyclopentene such as perfluorocyclopentene; cycloheptene, fluorine-containing cycloheptene such as perfluorocycloheptene; cyclooctene, and fluorine-containing cyclooctene such as perfluorocyclooctene.

The polymerization catalyst used for the synthesis of the fluorine-containing cycloolefin polymer of the invention using the above cycloolefins is not specifically restricted provided that the metathesis polymerization can be performed by the catalyst. Examples of such catalysts include:

tungsten type alkylidene catalysts, such as $W(N-2,6-Pr^i{}_2C_6H_3)(CHBu^t)(OBu^t)_2$, $W(N-2,6-Pr^i{}_2C_6H_3)(CHBu^t)(OCMe_2CF_3)_2$, $W(N-2,6-Pr^i{}_2C_6H_3)(CHBu^t)(OCMe_2(CF_3)_2)_2$, $W(N-2,6-Pr^i{}_2C_6H_3)(CHCMe_2Ph)(OBu^t)_2$, $W(N-2,6-Pr^i{}_2C_6H_3)(CHCMe_2Ph)(OCMe_2CF_3)_2$, $W(N-2,6-Pr^i{}_2C_6H_3)(CHCMe_2Ph)(OCMe_2(CF_3)2)_2$, $W(N-2,6-Me_2C_6H_3)(CHCHCMe_2Ph)(OBu^t)_2(PR_3)$, $W(N-2,6-Me_2C_6H_3)(CHCHCMe_2)(OBu^t)_2(PR_3)$, $W(N-2,6-Me_2C_6H_3)(CHCHCPh_2)(OBu^t)_2(PR_3)$, $W(N-2,6-Me_2C_6H_3)(CHCHCMePh)(OCMe_2(CF_3))_2(PR_3)$, $W(N-2,6-Me_2C_6H_3)(CHCHCMe_2)(OCMe_2(CF_3))_2(PR_3)$, $W(N-2,6-Me_2C_6H_3)(CHCHCPh_2)(OCMe_2(CF_3))_2(PR_3)$, $W(N-2,6-Me_2C_6H_3)(CHCHCMePh)(OCMe(CF_3)_2)_2(PR_3)$, $W(N-2,6-Me_2C_6H_3)(CHCHCMe_2)(OCMe_2(CF_3)_2)_2(PR_3)$, $W(N-2,6-Me_2C_6H_3)(CHCHCPh_2)(OCMe(CF_3)_2)_2(PR_3)$, $W(N-2,6-Pr^i{}_2C_6H_3)(CHCHCMePh)(OCMe_2(CF_3))_2(PR_3)$, $W(N-2,6-Pr^i{}_2C_6H_3)(CHCHCMePh)(OCMe(CF_3)_2)_2(PR_3)$, $W(N-2,6-Pr^i{}_2C_6H_3)(CHCHCMePh)(OPh)_2(PR_3)$, or $W(N-2,6-Me_2C_6H_3)(CHCHCMePh)(OBu^t)_2(Py)$, $W(N-2,6-Me_2C_6H_3)(CHCHCMe_2)(OBu^t)_2(Py)$, $W(N-2,6-Me_2C_6H_3)(CHCHCPh_2)(OBu^t)_2(Py)$, $W(N-2,6-Me_2C_6H_3)(CHCHCMePh)(OCMe_2(CF_3))_2(Py)$, $W(N-2,6-Me_2C_6H_3)(CHCHCMe_2)(OCMe_2(CF_3))_2(Py)$, $W(N-2,6-Me_2C_6H_3)(CHCHCPh_2)(OCMe_2(CF_3))_2(Py)$, $W(N-2,6-Me_2C_6H_3)(CHCHCMe_2)(OCMe(CF_3)_2)_2(Py)$, $W(N-2,6-Me_2C_6H_3)(CHCHCPh_2)(OCMe(CF_3)_2)_2(Py)$, $W(N-2,6-Pr^i{}_2C_6H_3)(CHCHCMePh)(OCMe_2(CF_3))_2(Py)$, $W(N-2,6-Pr^i{}_2C_6H_3)(CHCHCMePh)(OCMe(CF_3)_2)_2(Py)$ and $W(N-2,6-Pr^i{}_2C_6H_3)(CHCHCMePh)(OPh)_2(Py)$ (in these formulas, $Pr^i$ denotes an isopropyl group, R denotes an alkyl group, such as methyl or ethyl, or an alkoxy group, such as methoxy or ethoxy, $Bu^t$ denotes a tert-butyl group, Me denotes a methyl group, Ph denotes a phenyl group, and Py denotes a pyridine group);

molybdenum type alkylidene catalysts, such as $Mo(N-2,6-Pr^i{}_2C_6H_3)(CHBu^t)(OBu^t)_2$, $Mo(N-2,6-Pri^i{}_2C_6H_3)(CHBu^t)(OCMe_2CF_3)_2$, $Mo(N-2,6-Pr^i{}_2C_6H_3)(CHBu^t)(OCMe(CF_3)_2)_2$, $Mo(N-2,6-Pr^i{}_2C_6H_3)(CHCMe_2Ph)(OBu^t)_2(PR_3)$, $Mo(N-2,6-Pr^i{}_2C_6H_3)(CHCMe_2Ph)(OCMe_2CF_3)_2(PR_3)$, $Mo(N-2,6-Pr^i{}_2C_6H_3)(CHCMe_2Ph)(OCMe(CF_3)_2)_2(PR_3)$, $Mo(N-2,6-Pr^i{}_2C_6H_3)(CHCMe_2Ph)(OBu^t)_2(Py)$, $Mo(N-2,6-Pr^i{}_2C_6H_3)(CHCMe_2Ph)(OCMe_2CF_3)_2(Py)$ and $Mo(N-2,6-Pr^i{}_2C_6H_3)(CHCMe_2Ph)(OCMe(CF_3)_2)_2(Py)$ (in these formulas, $Pr^i$ denotes an isopropyl group, R denotes an alkyl group, such as methyl or ethyl, or an alkoxy group, such as methoxy or ethoxy, $Bu^t$ denotes a tert-butyl group, Me denotes a methyl group, Ph denotes a phenyl group, and Py denotes a pyridine group);

rhenium type alkylidene catalysts, such as $Re(CBu^t)(CHBu^t)(O-2,6-Pr^i{}_2C_6H_3)_2$, $Re(CBu^t)(CHBu^t)(O-2-Bu^tC_6H_4)_2$, $Re(CBu^t)(CHBu^t)(OCMe_2CF_3)_2$, $Re(CBu^t)(CHBu^t)(OCMe(CF_3)_2)_2$ and $Re(CBu^t)(CHBu^t)(O-2,6-Me_2C_6H_3)_2$ (in these formulas, $Bu^t$ denotes a tert-butyl group);

tantalum type alkylidene catalysts, such as $Ta[C(Me)C(Me)CHMe_3](O-2,6-Pr^i{}_2C_6H_3)_3Py$ and $Ta[C(Ph)C(Ph)CHMe_3](O-2,6-Pr^i{}_2C_6H_3)_3Py$ (in these formulas, Me denotes a methyl group, Ph denotes a phenyl group, and Py denotes a pyridine group); and ruthenium type alkylidene catalysts and titanacyclobutane catalysts, such as $Ru(CHCHCPh_2)(PPh_3)_2Cl_2$ and $Ru(CHCHCPh_2)(P(C_6H_{11})_3)_2Cl_2$ (in these formulas, Ph denotes a phenyl group).

The ring-opening metathesis catalysts mentioned above may be used singly or as a mixture of two or more kinds.

Other than the above-mentioned ring-opening metathesis catalysts, there can be also employed a ring-opening metathesis catalyst system that is a combination of an organic transition metal complex, a transition metal halide or a transition metal oxide and a Lewis acid as a co-catalyst, for example, a ring-opening metathesis catalyst consisting of a transition metal halogen complex, a transition metal halide or a transition metal oxide of molybdenum, tungsten or the like, and as a co-catalyst, an organic aluminum compound, an organic tin compound or an organometallic compound containing lithium, sodium, magnesium, zinc, cadmium, boron or the like.

For example, there can be mentioned:

catalysts of combinations of organic transition metal halogen complexes, specifically, tungsten type halogen complexes, such as $W(N-2,6-Pr^i{}_2C_6H_3)(thf)(OBu^t)_2Cl_2$, $W(N-2,6-Pr^i{}_2C_6H_3)(thf)(OCMe_2CF_3)_2Cl_2$, $W(N-2,6-Pr^i{}_2C_6H_3)(thf)(OCMe_2(CF_3)_2)_2Cl_2$, $W(N-2,6-Pr^i{}_2C_6H_3)(thf)(OBu^t)_2Cl_2$, $W(N-2,6-Pr^i{}_2C_6H_3)(thf)(OCMe_2CF_3)_2Cl_2$ and $W(N-2,6-Pr^i{}_2C_6H_3)(thf)(OCMe_2(CF_3)_2)_2Cl_2$ (in these formulas, $Pr^i$ denotes an isopropyl group, $Bu^t$ denotes a tert-butyl group, Me denotes a methyl group, Ph denotes a phenyl group, and thf denotes tetrahydrofuran), and organometallic compounds; and catalysts of combinations of organic transition metal halogen complexes, specifically, molybdenum type halogen complexes, such as $Mo(N-2,6-Pr^i{}_2C_6H_3)(thf)(OBu^t)_2Cl_2$, $Mo(N-2,6-Pr^i{}_2C_6H_3)(thf)(OCMe_2CF_3)_2Cl_2$, $Mo(N-2,6-Pr^i{}_2C_6H_3)(thf)(OCMe(C_{F3})_2)_2Cl_2$, $Mo(N-2,6-Pr^i{}_2C_6H_3)(thf)(OBu^t)_2Cl_2$, $Mo(N-2,6-Pr^i{}_2C_6H_3)(thf)(OCMe_2CF_3)_2Cl_2$ and $Mo(N-2,6-Pr^i{}_2C_6H_3)(thf)(OCMe(CF_3)_2)_2Cl_2$ (in these formulas, $Pr^i$ denotes an isopropyl group, $Bu^t$ denotes a tert-butyl group, Me denotes a methyl group, Ph denotes a phenyl group, and thf denotes tetrahydrofuran), or $WCl_6$, $WOCl_4$, $ReCl_5$, $MoCl_5$, $TiCl_4$, $RuCl_3$, $IrCl_3$ or the like, and organometallic compounds.

Examples of the organoaluminum compounds as co-catalysts include organoaluminum compounds, such as trimethylaluminum, triethylaluminum, triisobutylaluminum, trihexylaluminum, trioctylaluminum, triphenylaluminum, tribenzylaluminum, diethylaluminum monochioride, di-n-butylaluminum monochioride, diethylaluminum monobromide, diethylaluminum monoiodide, diethylaluminum monohydride, ethylaluminum sesquichloride and ethylaluminum dichloride; organotin compounds, such as tetramethyltin, diethyldimethyltin, tetraethyltin, dibutyldiethyltin, tetrabutyltin, tetraoctyltin, trioctyltin fluoride, trioctyltin chloride, trioctyltin bromide, trioctyltin iodide, dibutyltin difluoride, dibutyltin dichloride, dibutyltin dibromide, dibutyltin diiodide, butyltin trifluoride, butyltin trichloride, butyltin tribromide and butyltin triiodide; organolithium compounds, such as n-butyllithium; organosodium compounds, such as n-pentylsodium; organomagnesium compounds, such as methylmagnesium iodide, ethylmagnesium bromide, methylmagnesium bromide, n-propylmagnesium bromide, t-butylmagnesium chloride and allylmagnesium chloride; oranozinc compounds, such as diethylzinc; organocadminum compounds, such as diethylcadminum; and organoboron compounds, such as trimethylboron, triethylboron and tri-n-butylboron.

In the ring-opening metathesis polymerization, the molar ratio between the cycloolefin and the ring-opening metathesis catalyst is as follows: in case of the transition metal alkylidene catalyst of tungsten, molybdenum, rhenium, tantalum, ruthenium or the like or the titanacyclobutane catalyst, the molar ratio of the cycloolefin to the transition metal alkylidene complex is in the range of 2 to 10000, preferably 10 to 5000.

In case of the ring-opening metathesis catalyst consisting of the organic transition metal halogen complex, the transition metal halide or the transition metal oxide and the oranometallic compound, the molar ratio of the cycloolefin to the organic transition metal halogen complex, the transition metal halide or the transition metal oxide is in the range of 2 to 10000, preferably 10 to 5000, and the molar ratio of the organometallic compound as the co-catalyst to the organic transition metal halogen complex, the transition metal halide or the transition metal oxide is in the rang of 0.1 to 10, preferably 1 to 5.

The ring-opening metathesis polymerization can be carried out in the absence or the presence of a solvent. Examples of the solvents employable include ethers, such as tetrahydrofuran, diethyl ether, dibutyl ether, dimethoxyethane and dioxane; aromatic hydrocarbons, such as benzene, toluene, xylene and ethylbenzene; aliphatic hydrocarbons, such as pentane, hexane and heptane; alicyclic hydrocarbons, such as cyclopentane, cyclohexane, methylcyclohexane, dimethylcyclohexane and decalin; halogenated hydrocarbons, such as methylene dichloride, dichloroethane, dichloroethylene, tetrachloroethane, chlorobenzene and trichlorobenzene; fluorine-containing aromatic hydrocarbons, such as fluorobenzene, difluorobenzene, hexafluorobenzene, trifluoromethylbenzene and metaxylene hexafluoride; fluorine-containing aliphatic hydrocarbons, such as perfluorohexane; fluorine-containing alicyclic hydrocarbons, such as perfluorocyclodecalin; and fluorine-containing ethers, such as perfluoro-2-butyltetrahydrofuran. These solvents may be used as a mixture of two or more kinds.

An olefin that is used as a chain transfer agent to enhance catalyst efficiency may be used. Examples of such olefins include α-olefins, such as ethylene, propylene, butene, pentene, hexene and octane, and fluorine-containing α-olefins wherein these α-olefins are substituted with fluorine; silicon-containing olefins, such as vinyltrimethylsilane, allyltrimethylsilane, allyltriethylsilane and allyltriisopropylsilane, and fluorine-containing silicon-containing olefins thereof; and non-conjugated dienes, such as 1,4-pentadiene, 1,5-hexadiene and 1,6-heptadiene, and fluorine-containing non-conjugated dienes wherein these dienes are substituted with fluorine. These olefins, fluorine-containing olefins, dienes or fluorine-containing dienes may be used singly or in combination of two or more kinds.

The amount of the α-olefin, the fluorine-containing α-olefin, the diene or the fluorine-containing diene, which is allowed to coexist, is in the range of 0.001 to 1000, preferably 0.01 to 100, based on 1 equivalent of the cycloolefin monomer. The amount of the α-olefin, the fluorine-containing α-olefin, the diene or the fluorine-containing diene is in the range of 0.1 to 1000, preferably 1 to 500, based on 1 equivalent of the alkylidene of the transition metal alkylidene complex or the transition metal halide.

In the ring-opening metathesis polymerization, the concentration of the monomer/the solvent for the ring-opening metathesis catalyst is preferably in the range of 0.1 to 100 mol/liter, although it depends on the reactivity or the solubility of the monomer used. The polymerization reaction is carried out at a reaction temperature of usually −30 to 150° C. for a period of 1 minute to 120 hours. The reaction is terminated by the use of deactivating agents, for example, aldehydes such as butylaldehyde, ketones such as acetone, alcohols such as methanol, or fluorine-containing compounds thereof, whereby a ring-opening metathesis polymer solution can be obtained.

The fluorine-containing cycloolefin polymer according to the invention can be obtained by subjecting the ring-opening metathesis polymer to at least one of hydrogenation, hydrogen fluoride addition and fluorine addition.

The hydrogenation can be carried out by a process using a known hydrogenation catalyst. The hydrogen fluoride addition and the fluorine addition can be carried out by contacting the ring-opening metathesis polymer with hydrogen fluoride or fluorine in accordance with a known process.

By subjecting the double bond of the ring-opening metathesis polymer to at least one of hydrogenation, hydrogen fluoride addition and fluorine addition, the vacuum ultraviolet (VUV) absorption wavelength region can be lowered. This can be readily understood from the fact that the absorption band of the double bond is present even in the region of ArF eximer laser beam of a wavelength of 193 nm. Accordingly, in order to increase the VUV transmittance in the region of F2 laser beam of a VUV wavelength of 157 nm as highly as possible, it becomes essential to carry out at least one of hydrogenation, hydrogen fluoride addition and fluorine addition of the double bond of the ring-opening metathesis polymer.

The hydrogenation of the ring-opening metathesis polymer is described below in detail.

Examples of the hydrogenation catalysts for the hydrogenation reaction include, as heterogeneous catalysts, metallic catalysts, such as palladium, platinum, platinum oxide, rhodium and ruthenium, and supported type metallic catalysts wherein metals such as palladium, platinum, nickel, rhodium and ruthenium are supported on carriers such as carbon, silica, alumina, titania, magnesia, diatomaceous earth and synthetic zeolite; and as homogeneous catalysts, nickel naphthenate/triethyl aluminum, nickelacetyl acetonato/triisobutylaluminum, cobalt octenate/n-butyllithium, titanocene dichloride/diethylaluminum chloride, rhodium acetate, dichlorobis(triphenylphosphine) palladium, chlorotris(triphenylphosphine)rhodium, dihydridotetrakis(triphenylphosphine)ruthenium, (tricyclohexylphosphine)(1,5-cyclooctadiene)(pyridine) and iridium haxafluorophosphate. Also available as a homogeneous catalyst is a hydrogenation catalyst comprising an organometallic complex represented by the following formula (4) and an amine compound which are held in the presence of hydrogen.

$$MH_kQ_hT_pZ_q \qquad (4)$$

In the formula (4), M is ruthenium, rhodium, osmium, iridium, palladium, platinum or nickel.

H is hydrogen.

Q is a halogen, such as a chlorine atom, a fluorine atom, a bromine atom or an iodine atom.

T is CO, NO, toluene, acetonitrile or tetrahydrofuran.

Z is an organophosphorus compound residue represented by $PR'^1R'^2R'^3$ (P is phosphorus, and $R'^1$, $R'^2$ and $R'^3$ are the same or different and are each independently a straight-chain, branched or cyclic alkyl, alkenyl, aryl, alkoxy or aryloxy group).

Examples of the organophosphorus compounds include trimethylphosphine, triethylphosphine, triisopropylphosphine, tri-n-propylphosphine, tri-t-butylphosphine, triisobutylphosphine, tri-n-butylphosphine, tricyclohexylphosphine, triphenylphosphine, methyldiphenylphosphine, dimethylphenylphosphine, tri-o-tolylphosphine, ti-m-tolylphosphine, tri-p-tolylphosphine, diethylphenylphosphine, dichloro(ethyl)phosphine, dichloro(phenyl)phosphine, chlorodiphenylphosphine, trimethyl phosphite, triisopropyl phophite and triphenyl phosphite.

K is 0 or an integer of 1, h is an integer of 1 to 3, p is 0 or an integer of 1, and q is an integer of 2 to 4.

Examples of the organometallic complexes represented by the formula (4) include dichlorobis(triphenylphosphine)nickel,
dichlorobis(triphenylphosphine)palladium,
dichlorobis(triphenylphosphine)platinum,
chlorotris(triphenyiphosphine)rhodium,
dichlorotris(triphenylphosphine)osmium,
dichlorohydridobis(triphenylphosphine)iridium,
dichlorotris(triphenylphosphine)ruthenium,
dichlorotetrakis(triphenylphosphine)ruthenium,
trichloronitrobis(triphenylphosphine)ruthenium,
dichlorobis(acetonitrile)bis(triphenylphosphine)ruthenium,
dichlorobis(tetrahydrofuran)bis(triphenylphosphine)ruthenium,
chlorohydrido(toluene)tris(triphenylphosphine)ruthenium,
chlorohydridocarbonyltris(triphenylphosphine)ruthenium,
chlorohydridocarbonyltris(diethylphenylphosphine)ruthenium,
chlorohydridonitrosyltris(triphenyiphosphine)ruthenium,
dichlorotris(trimethylphosphine)ruthenium,
dichlorotris(triethylphosphine)ruthenium,
dichlorotris(tricyclohexylphosphine)ruthenium,
dichlorotris(triphenylphosphine)ruthenium,
dichlorotris(trimethyldiphenylphosphine)ruthenium,
dichlorotris(tridimethylphenylphosphine)ruthenium,
dichlorotris(tri-o-tolylphosphine)ruthenium,
dichlorotris(dichloroethylphenylphosphine)ruthenium,
dichlorotris(dichlorophenyiphosphine)ruthenium,
dichlorotris(trimethylphosphine)ruthenium and
dichlorotris(triphenylphosphine)ruthenium.

Examples of the amine compounds include primary amine compounds, such as methylamine, ethylamine, aniline, ethylenediamine and 1,3-diaminocyclobutane; secondary amine compounds, such as dimethylamine, methylisopropylamine and N-methylaniline; and tertiary amine compounds, such as trimethylamine, triethylamine, triphenylamine, N,N-dimethylaniline, pyridine and γ-picoline. Of these, tertiary amine compounds are preferably employed. Especially when triethylamine is used, the degree of hydrogenation is remarkably enhanced.

These organometallic complexes and amine compounds can be each used in combination of two or more kinds in an arbitrary proportion.

In the hydrogenation of the ring-opening metathesis polymer, the hydrogenation catalyst is used in an amount of 5 ppm to 100% by weight, preferably 100 ppm to 20% by weight, in terms of metal, based on the ring-opening metathesis polymer. When the hydrogenation catalyst comprising the organometallic complex and the amine compound is used, the amount of the organometalic complex is in the range of 5 to 50000 ppm, preferably 10 to 10000 ppm, particularly preferably 50 to 1000 ppm, based on the ring-opening metathesis polymer. The amount of the amine compound is in the range of 0.1 equivalent to 1000 equivalents, preferably 0.5 equivalent to 500 equivalents, particularly preferably 1 equivalent to 100 equivalents, based on the organometallic complex.

As the hydrogenation catalyst comprising the organometallic complex and the amine compound, a catalyst obtained by previously contacting the organometallic complex with the amine compound can be used, but it is also possible to add the organomtallic complex and the amine compound directly to the reaction system without contacting them previously.

The solvent used for the hydrogenation reaction of the ring-opening metathesis polymer is not specifically restricted provided that the solvent dissolves the ring-opening metathesis polymer and the solvent itself is not hydrogenated. Examples of such solvents include ethers, such as tetrahydrofuran, diethyl ether, dibutyl ether and dimethoxyethane; aromatic hydrocarbons, such as benzene, toluene, xylene and ethylbenzene; aliphatic hydrocarbons, such as pentane, hexane and heptane; alicyclic hydrocarbons, such as cyclopentane, cyclohexane, methylcyclohexane, dimethylcyclohexane and decalin; halogenated hydrocarbons, such as methylene dichloride, dichloroethane, dichloroethylene, tetrachloroethane, chlorobenzene and trichlorobenzene; fluorine-containing aromatic hydrocarbons, such as fluorobenzene, difluorobenzene, hexafluorobenzene, trifluoromethylbenzene and metaxylene hexafluoride; fluorine-containing aliphatic hydrocarbons, such as perfluorohexane; fluorine-containing alicyclic hydrocarbons, such as perfluorocyclodecalin; and fluorine-containing ethers, such as perfluoro-2-butyltetrahydrofuran. These solvents may be used as a mixture of two or more kinds.

The hydrogenation reaction of the ring-opening metathesis polymer is carried out at a hydrogen pressure of usually atmospheric pressure to 30 MPa, preferably 0.5 to 20 MPa, particularly preferably 2 to 15 MPa, and the reaction temperature is in the range of usually 0 to 300° C., preferably room temperature to 250° C., particularly preferably 50 to 200° C.

The fluorine addition of the ring-opening metathesis polymer is described below in detail.

The hydrogen fluoride addition or the fluorine addition can be carried out by contacting the double bond of the ring-opening metathesis polymer with hydrogen fluoride or fluorine. Since the reaction rate of the catalytic reaction of the ring-opening metathesis polymer with hydrogen fluoride or fluorine is high, a liquid phase/solid phase reaction or a liquid phase/liquid phase reaction is preferable to a gas phase/solid phase reaction. Further, from the viewpoint of restriction of heat removal, a reaction in a liquid phase of a liquid medium or a reaction in a gas phase diluted with an inert gas is preferable to a reaction using high-concentration hydrogen fluoride or fluorine.

The liquid medium of the liquid phase may be a solvent capable of dissolving the ring-opening metathesis polymer or a solvent capable of suspending the polymer, and is not specifically restricted provided that the liquid medium is a solvent that is not reactive with hydrogen fluoride or fluorine. Examples of such liquid media include ethers, such as tetrahydrofuran, diethyl ether, dibutyl ether and dimethoxyethane; aromatic hydrocarbons, such as benzene, toluene, xylene and ethylbenzene; aliphatic hydrocarbons, such as pentane, hexane and heptane; alicyclic hydrocarbons, such as cyclopentane, cyclohexane, methylcyclohexane, dimethylcyclohexane and decalin; halogenated hydrocarbons, such as methylene dichloride, dichloroethane, dichloroethylene, tetrachloroethane, chlorobenzene and trichlorobenzene; fluorine-containing aromatic hydrocarbons, such as fluorobenzene, difluorobenzene, hexafluorobenzene, trifluoromethylbenzene and metaxylene hexafluoride; fluorine-containing aliphatic hydrocarbons, such as perfluorohexane; fluorine-containing alicyclic hydrocarbons, such as perfluorocyclodecalin; and fluorine-containing ethers, such as perfluoro-2-butyltetrahydrofuran. These solvents may be used as a mixture of two or more kinds.

The inert gas used for diluting hydrogen fluoride or fluorine is not specifically restricted provided that the inert gas is not reactive with hydrogen fluoride or fluorine. Examples of such inert gases include inert gases, such as nitrogen, argon and helium, and hydrocarbon gases, such as methane, ethane and propane. These gasses may be used as a mixture of two or more kinds.

The contact amount ratio between the hydrogen fluoride or fluorine and the ring-opening metathesis polymer depends upon the amount of double bonds, and based on at least one double bond portion, an equimolar amount of hydrogen fluoride or fluorine is used. The amount of hydrogen fluoride or fluorine used is in the range of 1 to 100 mol equivalents, preferably 1 to 20 mol equivalents, based on the number of moles of the double bond portion.

The temperature of the hydrogen fluoride or fluorine addition reaction to the ring-opening metathesis polymer is in the range of usually −100 to 200° C., preferably room temperature to 150° C., particularly preferably 50 to 100° C. The reaction pressure is not specifically restricted and is in the range of preferably atmospheric pressure to 10 MPa, more preferably atmospheric pressure to 1 MPa. When the ring-opening metathesis polymer is dissolved in a solvent, the concentration of the polymer is in the range of 1 to 80% by weight, preferably 5 to 50% by weight. The reaction of a gas phase containing hydrogen fluoride or fluorine with a solid phase comprising the ring-opening metathesis polymer is preferably carried out under fluidizing or stirring, but the solid may be allowed to stand still and contacted with the gas phase to perform addition reaction.

In the present invention, after the double bonds of the ring-opening metathesis polymer are partially hydrogenated, they may be contacted with hydrogen fluoride or fluorine to further perform fluorine addition reaction. The amount of double bonds partially hydrogenated is not more than 95%, preferably not more than 90%, based on the total amount of the double bonds. Immediately after the hydrogenation reaction, hydrogen fluoride or fluorine may be added to the hydrogenation reaction solution to perform the addition reaction. Moreover, it is possible that the polymer solution obtained after the hydrogenation reaction is contacted with a poor solvent to precipitate a polymer, and then the solid polymer may be contacted with hydrogen fluoride or fluorine, or the solid polymer is dissolved in a solvent again and may be contacted with hydrogen fluoride or fluorine.

From the fluorine-containing cycloolefin polymer obtained by the contact with hydrogen fluoride or fluorine, excess hydrogen fluoride or fluorine can be removed by a known alkali neutralization treatment. After the addition reaction, the fluorine-containing cycloolefin polymer is contacted with sodium hydroxide, sodium hydrogencarbonate, organic amines such as diethylamine, or an alkaline aqueous solution or alkaline organic solution of pyridine, to perform neutralization and washing. Thus, the residual hydrogen fluoride or fluorine can be removed. In this treatment, the contact is desirably carried out at a temperature of room temperature to 200° C., preferably room temperature to 100° C., under stirring or flowing, but the conditions are not specifically limited.

When all the double bonds in the main chain olefin portion of the ring-opening metathesis polymer are added with fluorine, dissociation reaction of fluorine ion takes place in the bond between fluorine atom and carbon atom by excitation energy in case of the exposure of ultraviolet rays having a wavelength of 157 nm that is vacuum ultraviolet rays of high energy, and as a result, the main chain of the polymer occasionally undergoes cleavage reaction to cause deterioration of the polymer. Especially between carbon atoms to which the fluorine-carbon bond of the main chain is adjacent, this dissociation reaction takes place markedly. On the other hand, in the bond between hydrogen atom and carbon atom, the dissociation reaction hardly takes place as compared with the above case, and it is important to allow the main chain to have a certain quantity of hydrogen-carbon bonds. In order to prevent the polymer deterioration caused by the dissociation reaction of the fluorine ion, it is preferable to add hydrogen fluoride or to partially hydrogenate double bonds of the olefin portion in the presence of a hydrogenation catalyst and then contact the remaining double bonds with fluorine, whereby the light resistance of the polymer in the vacuum ultraviolet region is improved.

When at least one of the hydrogenation, the hydrogen fluoride addition and the fluorine addition of the ring-opening metathesis polymer is carried out, the ring-opening metathesis polymer can be dissolved in a solvent again after isolated from the ring-opening metathesis polymer solution, but for example, hydrogenation reaction can be carried out by adding a metallic catalyst or a supported type metallic catalyst that is the aforesaid heterogeneous catalyst or a hydrogenation catalyst comprising an organometallic complex or an organometallic complex and an amine compound that is the aforesaid homogeneous catalyst, without performing isolation. In this case, after completion of the ring-opening metathesis polymerization or the hydrogenation reaction, the ring-opening metathesis catalyst or the hydrogenation catalyst remaining in the polymer can be removed by a known method. For example, available are a filtration method, an adsorption method using an adsorbent, a method comprising adding an organic acid such as lactic acid, a poor solvent and water to a good solvent solution and then extracting and removing the catalyst residue from the system at room temperature or under heating, and a method comprising contacting a good solvent solution or a polymer slurry with a basic compound and an acid compound and then washing the system to remove the catalyst residue.

The method to recover the fluorine-containing cycloolefin polymer from the fluorine-containing cycloolefin polymer solution in which at least one of the hydrogenation, the hydrogen fluoride addition and the fluorine addition of the ring-opening metathesis polymer has been carried out is not specifically limited, and known methods are employable. For example, employable are a method comprising introducing the reaction solution into a poor solvent with stirring to solidify the fluorine-containing cycloolefin polymer and recovering the polymer by filtration, centrifugal separation, decantation or the like, a steam stripping method comprising blowing steam into the reaction solution to precipitate the fluorine-containing cycloolefin polymer, and a method comprising heating the reaction solution to directly remove the solvent.

By carrying out at least one of the hydrogenation, the hydrogen fluoride addition and the fluorine addition, a degree of hydrogenation or a degree of fluorine addition of not less than 90% can be readily reached, and it is possible to obtain a value of not less than 95%, particularly a value of not less than 99%. If the degree of hydrogenation or the degree of fluorine addition is less than 90%, the transmission to the vacuum ultraviolet rays is lowered, and the light resistance cannot be expected. The fluorine-containing cycloolefin polymer in which not less than 90% of double bonds have been subjected to hydrogenation, hydrogen fluoride addition or fluorine addition is practically excellent in the transmission to the vacuum ultraviolet rays and the light resistance, and can be applied to thin films or coating materials employable with vacuum ultraviolet rays such as F2 laser beam. Further, the fluorine-containing cycloolefin polymer can be applied to resist polymers employable with vacuum ultraviolet rays such as F2 laser beam.

In the present invention, the ring-opening metathesis polymer is subjected to at least one of hydrogenation, hydrogen fluoride addition and fluorine addition to obtain a hydrogenation product, a hydrogen fluoride addition product or a fluorine addition product of the ring-opening metathesis polymer, and then, if necessary, the functional groups of the resulting product can be partially hydrolyzed to convert the functional groups to a carboxylic acid or an alcohol. The functional groups to be hydrolyzed are alkoxycarbonyl, alkoxycarbonyloxy, alkoxycarbonylalkyl, alkoxycarbonyloxyalkyl, alkylcarbonyloxy, alkylsulfonyloxy, arylsulfonyloxy, alkoxy and alkoxyalkyl. This hydrolysis may be any one of acid hydrolysis that is conducted in the presence of an acid catalyst such as sulfuric acid, hydrochloric acid, nitric acid, toluenesulfonic acid, trifluoroacetic acid or acetic acid, alkaline hydrolysis that is conducted in the presence of an alkaline catalyst such as sodium hydroxide, potassium hydroxide or barium hydroxide, and neutral hydrolysis using sodium acetate, lithium iodide or the like instead of an acid or an alkali.

Owing to the hydrolysis, a thin film or a coating material comprising the fluorine-containing cycloolefin polymer, which is employable with vacuum ultraviolet rays such as F2 laser beam, can be improved in the adhesion properties to a frame substrate or an optical substrate such as lens. Further, a resist polymer comprising the fluorine-containing cycloolefin polymer, which is employable with vacuum ultraviolet rays such as F2 laser beam, can be improved in the adhesion properties to a silicon substrate or the solubility in an alkaline developing solution.

In the hydrolysis reaction, any of a water solvent and an organic solvent can be used. Examples of the organic solvents include alcohols, such as methanol and ethanol; ketones, such as acetone; ethers, such as tetrahydrofuran, diethyl ether, dibutyl ether, dimethoxyethane and dioxane; aromatic hydrocarbons, such as benzene, toluene, xylene and ethylbenzene; aliphatic hydrocarbons, such as pentane, hexane, heptane and cyclohexane; carboxylic acids, such as acetic acid; nitro compounds, such as nitromethane; pyridines, such as pyridine and lutidine; formamides, such as dimethylformamide; fluorine-containing aromatic hydrocarbons, such as fluorobenzene, difluorobenzene, hexafluorobenzene, trifluoromethylbenzene and metaxylene hexafluoride; fluorine-containing aliphatic hydrocarbons, such as perfluorohexane; fluorine-containing alicyclic hydrocarbons, such as perfluorocyclodecalin; and fluorine-containing ethers, such as perfluoro-2-butyltetrahydrofuran. These solvents may be mixed with water or alcohols, or only the organic solvent may be used. Further, these solvents may be used as a mixture of two or more kinds. The reaction temperature is in the range of usually 0 to 300° C., preferably room temperature to 250° C.

After the acid or alkaline hydrolysis, neutralization with alkali or acid may be carried out. The method to recover the polymer from the solution or the slurry containing the hydrogenation product, the hydrogen fluoride addition product or the fluorine addition product of the ring-opening metathesis polymer after the hydrolysis is not specifically limited, and known methods are employable. In case of the solution, employable are, for example, a method comprising introducing the reaction solution into a poor solvent with stirring to precipitate the hydrogenation product, the hydrogen fluoride addition product or the fluorine addition product of the ring-opening metathesis polymer and then subjecting the resulting slurry to filtration, centrifugal separation, decantation or the like to recover the polymer, a steam stripping method comprising blowing steam into the reaction solution to precipitate the polymer, and a method comprising heating the reaction solution to directly remove the solvent. In case of the slurry, employable is, for example, a method comprising subjecting the slurry to filtration, centrifugal separation, decantation or the like to recover the polymer.

Uses

The fluorine-containing cycloolefin polymer of the invention has excellent light transmission over a wide range of visible region to vacuum ultraviolet region and has low light refractive index. Further, the polymer of the invention can be imparted with heat resistance, chemical resistance and water resistance.

Preferred examples of uses utilizing such properties of the fluorine-containing cycloolefin polymer include optical parts, thin films, pellicle membranes and coating materials.

Examples of the optical parts include information disc substrates, such as photomagnetic disc, colorant type disc, music compact disc, and image music simultaneous recording and reproduction disc; photographing type or projection type lenses and mirror lenses used for camera, VTR, copy machine, OHP, projection TV and printer; lenses for picking up information from information discs or bar codes; automotive lamps or lenses of eye glasses and goggles; information transfer parts, such as optical fiber and connector thereof; films and sheets used in the information-recording or information-display fields, such as information recording substrate in a shape other than disc shape (optical card), liquid crystal substrate, phase shift film, polarizing film, light guide board and protective moisture-proof film; and reflective films such as composite two-layer film having high-refraction film.

The coating material is obtained by dissolving the fluorine-containing cycloolefin polymer in an appropriate solvent to give a solution, then casting the solution on an appropriate base material or substrate and drying the solution to form a thin film or a coating film. The thin film and the pellicle membrane are obtained by stripping the thus formed thin film and the coating film.

As the solvent for the preparation of the solution, any solvent can be used without specific restriction provided that it can dissolve the fluorine-containing cycloolefin polymer. Examples of the solvents include fluorine-containing aromatic hydrocarbons, such as metaxylene hexafluoride, benzotrifluoride, fluorobenzene, difluorobenzene, hexafluorobenzene, trifluoromethylbenzene and metaxylene hexafluoride; fluorine-containing aliphatic hydrocarbons, such as perfluorohexane; fluorine-containing alicyclic hydrocarbons, such as perfluorocyclodecalin; fluorine-containing ethers, such as perfluoro-2-butyltetrahydrofuran; alicyclic hydrocarbons, such as cyclopentane, cyclohexane, methylcyclohexane, dimethylcyclohexane and decalin; and ketones, such as cyclohexanone.

Prior to film formation, the solution of the fluorine-containing cycloolefin polymer is desirably filtered through a filter having appropriate pore diameters to remove solventinsoluble impurities such as trace level metallic component and trace level colloidal component.

The concentration of the fluorine-containing cycloolefin polymer in the solution is in the range of usually 1 to 20% by weight, preferably 2 to 10% by weight. If the olefin polymer concentration of the solution is lower than the lower limit of the above range, the efficiency of film formation or removal of impurities tends to lower. On the other hand, if the concentration is higher than the upper limit, the viscosity of the solution is increased, and hence workability of film formation or removal of impurities tends to lower.

In order to form the thin film using the fluorine-containing cycloolefin polymer solution, a film casting method per se publicly known, such as spin coating or knife coating, is available, and it is preferable to cast the polymer solution on a smooth substrate surface such as glass plate to form a thin film. The thickness of the thin film can be readily controlled by changing solution viscosity, rotation speed of the substrate, etc. The thin film on the substrate is dried by an appropriate means such as application of hot air or irradiation with infrared rays to remove the residual solvent.

The thickness of the thin film as a pellicle membrane is generally in the range of 0.05 to 10 $\mu$m, and the thickness is preferably so determined that the transmittance to the wavelength of the short wavelength light exposure becomes high. In case of a F2 laser beam having a wavelength of 157 nm, a thickness of usually 0.1 to 2 $\mu$m is suitable.

The thin film, the coating material and the pellicle membrane according to the invention can be used as they are, that is to say, they can be used as a single-layer thin film or coating film, or they can be used as a multi-layer film consisting of the film and a known inorganic or organic anti-reflection film formed on one or both surfaces of the film.

The pellicle used for the process for forming a pattern by lithography is made by spreading the thin film obtained by the above process on one side of a pellicle frame and coating the other side with an adhesive or a double-sided tape, and the pellicle is so designed that it can be fitted onto a mask.

As the pellicle frame, a frame made of a metal such as aluminum, aluminum alloy or stainless steel, a frame made of a synthetic resin or a frame made of ceramic is used, without limiting thereto.

For spreading the thin film on the pellicle frame, a known adhesive, such as a silicone resin adhesive or a fluororesin adhesive, is used. According to such a structure of the pellicle, introduction of a foreign substance from the outside can be prevented. Even if a foreign substance adheres to the membrane, an image of the foreign substance is out of the focal point in the exposure and is not transferred, so that a trouble hardly occurs.

In order to prevent occurrence of dust inside the pellicle, a layer of a tacky material per se publicly known can be formed on the inner side of the pellicle frame or the pellicle membrane. That is to say, provision of a tacky layer on the inner side of the pellicle frame or the pellicle membrane is advantageous in that occurrence of dust inside the pellicle can be prevented and floating dust can be fixed and prevented from adhesion to the mask.

In the process for forming a pattern by lithography according to the invention, the pellicle having a pellicle membrane prepared by the above process is fitted to a photo mask or a reticle in which a circuit pattern made of a deposited film such as a chromium film is formed on a glass substrate, and the circuit pattern is transferred onto a silicon wafer coated with a resist by the exposure using an exposure light having an extremely short wavelength, particularly a F2 laser beam having a wavelength of 157 nm.

According to the present invention, even if an exposure light having an extremely short wavelength, particularly a F2 laser beam having a wavelength of 157 nm, is used, lowering of durability of the pellicle membrane caused by photodecomposition is less brought about, and the transmittance is good. As a result, a sharp and fine pattern can be stably formed by lithography for a relatively long period of time.

The photoresist composition of the invention uses the aforesaid fluorine-containing cycloolefin polymer as a photoresist base polymer, and for example, the composition is used as a positive photoresist using an acid generator and a solvent together with the fluorine-containing cycloolefin polymer.

The acid generator used herein is a substance which generates Brønsted acid or Lewis acid when exposed to active radiation such as an excimer laser beam. There is no specific limitation on the acid generator, and any acid generator selected from those heretofore known as acid generators for chemical amplification type photoresists can be employed.

To the photoresist composition, additives conventionally used for photoresists, such as additional resin to improve properties of resist film, plasticizer, heat stabilizer, antioxidant, adhesion improver, colorant, surface active agent, anti-halation agent, organic carboxylic acid and amines, can be added within limits not detrimental to the properties of the photoresist composition.

Using the photoresist composition of the invention, a pattern can be formed by known lithography. For example, the photoresist composition is applied to a surface of a substrate such as a silicon wafer by a conventional means such as spin coating in such a manner that the film thickness becomes 0.5 to 2.0 $\mu$m, and then prebaked on a hot plate at 50 to 160° C. for 1 to 20 minutes, preferably at 80 to 120° C. for 1 to 10 minutes, to remove the solvent, whereby a photoresist film can be formed. Subsequently, a mask for forming a desired pattern is held over the photoresist film, then the photoresist film is irradiated with active rays or radiation such as far ultraviolet rays, KrF excimer laser beam, ArF excimer laser beam, F2 laser beam, X rays or electron rays, and the photoresist film is subjected to heat treatment (baking after exposure) on a hot plate at 50 to 160° C. for 1 to 20 minutes, preferably at 80 to 120° C. for 1 to 10 minutes. Then, the exposed portion is washed with a developing solution such as an alkaline aqueous solution of tetramethylammonium hydroxide having a concentration of 0.1 to 5%, preferably 1 to 3%, in a conventional way such as immersion, paddling or spraying, whereby a relief pattern is obtained on the substrate.

The relief pattern formed by the use of the photoresist composition of the invention is extremely good in both of the resolution and the contrast. The fluorine-containing cycloolefin polymer of the invention is useful particularly as a photoresist base polymer for a F2 laser beam. Moreover, by the use of the pattern formed as above as a mask, the substrate can be etched.

EXAMPLES

The present invention is further described with reference to the following examples, but it should be construed that the invention is in no way limited to those examples.

Property values of the polymers obtained in the examples are measured by the following methods.

Average Molecular Weight

The fluorine-containing cycloolefin polymer obtained was dissolved in tetrahydrofuran, and the average molecular weight was measured with gel permeation chromatography (GPC) using Nippon Bunko 830-R1 and UVIDEC-100-VI as detectors and columns of Shodex k-805, 804, 803 and 802.5 under the conditions of room temperature and a flow rate of 1.0 ml/min, followed by calibration of the molecular weight with a polystyrene standard.

Degree of Hydrogenation

A powder of the fluorine-containing cycloolefin polymer was dissolved in deutero chloroform, deutero tetrahydrofuran, hexafluorobenzene or deutero acetone, and the integral area of an absorption spectrum of hydrogen bonded to the main chain double bond carbon at δ of 4.5 to 7.0 ppm was calculated using a 270 MHz-$^1$H-NMR spectrum, or the integral area of an absorption spectrum derived from the main chain double bond carbon at δ of 90 to 160 ppm was calculated using a 67.5 MHz-$^{13}$C-NMR spectrum.

VUV (Vacuum Ultraviolet) Absorption Spectrum

A polymer solution was applied onto a $CaF_2$ plate in a film thickness of 0.1 to 0.8 μm by the use of a spin coater at 200 to 800 rpm and dried. Then, a VUV absorption spectrum of the resulting film was measured by Acton-502 or a Bunko Keiki VU-201 type vacuum ultraviolet spectrophotometer, and the film thickness was measured by a feeler type film thickness meter Decktack 3030, to determine an absorption coefficient at 157 nm.

Refractive Index

A 5 wt % polymer solution (solvent; mixed solvent of metaxylene hexafluoride/cyclohexanone (3/1)) was dropped on a 4-inch silicon wafer and applied by a spin coater under the conditions of 300 rpm×60 sec, then dried in nitrogen under the conditions of 160° C.×10 min to prepare a refractive index measuring sample. Then, the refractive index of the thin film sample was measured using a thin film measuring device F20-UV (manufactured by FILMETICS Co.) through refractive index spectroscopy at a measuring wavelength of 350 to 850 nm.

Visible to Ultraviolet Absorption Spectrum

A polymer solution was applied onto a $CaF_2$ plate in a film thickness of 0.8 to 1.0 μm by the use of a spin coater at 50 to 300 rpm and dried. Then, the absorption spectrum of the resulting film was measured by a Shimadzu Seisakusho UV-3100S type visible and ultraviolet spectrophotometer to obtain transmittance at 400 nm and 193 nm. The film thickness was measured by a feeler type film thickness meter Decktack 3030.

Glass Transition Temperature and 5% Decomposition Temperature

The glass transition temperature and the 5% decomposition temperature were measured by the use of Shimadzu Seisakusho DSC-50 and TA-50.

HOMO Energy Difference

In the calculation of the HOMO energy difference, a molecular orbital method calculation software MOPAC 93 was used, and keywords relating to structure optimization, EF, LET, DDMIN=0 and GNORM=0.3, were used.

Example 1

In a nitrogen atmosphere, 5 g of 5-trifluoromethylbicyclo[2.2.1]hept-2-ene synthesized in accordance with the aforesaid process and the process of Example 7 described later was placed in a 100 ml flask as a cycloolefin monomer and dissolved in 50 ml of tetrahydrofuran (referred to as "THF" hereinafter), following by stirring with a magnetic stirrer bar. To the solution, 91 mg of $W(N-2,6-Me_2C_6H_3)(CHCHCMe_2)(OBU^t)_2(PMe_3)$ was added as a ring-opening metathesis polymerization catalyst, and the reaction mixture was stirred at room temperature for 16 hours. Thereafter, 69 μl of butylaldehyde was added, and the reaction mixture was stirred for 30 minutes to terminate the reaction.

The obtained ring-opening metathesis polymer solution was introduced into 500 ml of methanol to precipitate a ring-opening metathesis polymer, and the polymer was filtered, washed with methanol and dried in vacuo to obtain 3.5 g of a ring-opening metathesis polymer powder.

Thereafter, in a 200 ml autoclave, 2 g of the ring-opening metathesis polymer powder was dissolved in 50 ml of decahydronaphthalene, then 4 g of 5% Pd/C was added as a hydrogenation catalyst, and hydrogenation reaction was carried out at a hydrogen pressure of 10 MPa and 140° C. for 24 hours. Then, the temperature was returned to room temperature, and the hydrogen gas was released. The hydrogenated ring-opening metathesis polymer was filtered, and the polymer was extracted with THF by the use of a Soxhlet extractor. The extract was introduced into methanol to precipitate the hydrogenated product of the ring-opening metathesis polymer, followed by filtration separation and drying in vacuo. Thus, 1–25 g of a white powdery hydrogenated ring-opening metathesis polymer (fluorine-containing cycloolefin polymer) was obtained. In the $^1$H-NMR spectrum of the obtained fluorine-containing cycloolefin polymer, any peak assigned to a proton of the main chain olefin was not observed, and the degree of hydrogenation calculated from the $^1$H-NMR spectrum was 100%. The weight-average molecular weight Mw as measured with GPC was 55,500, and Mw/Mn was 1.04.

A 2 wt % metaxylene hexafluoride solution of the obtained fluorine-containing cycloolefin polymer was prepared. The solution was dropped onto a $CaF_2$ substrate and applied with a spin coater at speed of 800 rpm. Then, the coating substrate was dried at 160° C., and a VUV spectrum was measured. The spectrum is shown in FIG. 1. The absorption coefficient of the polymer at 157 nm was 1.172 μm$^{-1}$.

Example 2

In a nitrogen atmosphere, 5 g of 5,6-bistrifluoromethylbicyclo[2.2.1]hepta-2,5-diene synthesized in accordance with the aforesaid process and the process of Example 7 described later was placed in a 100 ml flask as a cycloolefin monomer and dissolved in 50 ml of THF, following by stirring with a magnetic stirrer bar. To the solution, 65 mg of $W(N-2,6-Me_2C_6H_3)(CHCHCMe_2)(OBu^r)_2(PMe_3)$ was added as a ring-opening metathesis polymerization catalyst, and the reaction mixture was stirred at room temperature for 16 hours. Thereafter, 49 μl of butylaldehyde was added, and the reaction mixture was stirred for 30 minutes to terminate the reaction. The obtained ring-opening metathesis polymer solution was introduced into 500 ml of methanol to precipitate a ring-opening metathesis polymer, and the polymer was filtered, washed with methanol and dried in vacuo to obtain 4.9 g of a ring-opening metathesis polymer powder.

Thereafter, in a 200 ml autoclave, 2 g of the ring-opening metathesis polymer powder was dissolved in 50 ml of THF, then 4 g of 5% Pd/C was added as a hydrogenation catalyst, and hydrogenation reaction was carried out at a hydrogen pressure of 10 MPa and 140° C. for 24 hours. Then, the temperature was returned to room temperature, and the hydrogen gas was released. The hydrogenated ring-opening metathesis polymer was filtered and Pd/C was removed therefrom, and then the filtrate was introduced into methanol to precipitate the hydrogenated product of the ring-opening metathesis polymer, followed by filtration separation and drying in vacuo. Thus, 1.25 g of a white powdery hydrogenated ring-opening metathesis polymer (fluorine-containing cycloolefin polymer) was obtained.

In the $^1$H-NMR spectrum and the $^{13}$C-NMR spectrum of the obtained fuorine-containing cycloolefin polymer, any peak assigned to a double bond of the main chain and the five-membered ring carbon was not observed, and the degree of hydrogenation calculated from the $^1$H-NMR spectrum and the $^{13}$C-NMR spectrum was 100%. The weight-average molecular weight Mw as measured with GPC was 57,500, and Mw/Mn was 1.04.

The obtained fluorine-containing cycloolefin polymer was applied onto a CaF$_2$ substrate in the same manner as in Example 1. Then, the coating substrate was dried at 160° C., and a VUV spectrum was measured. The spectrum is shown in FIG. 1. The absorption coefficient of the polymer at 157 nm was 0.190 $\mu$m$^{-1}$.

Example 3

In a nitrogen atmosphere, 5 g of 5,6-bistrifluoromethyl-7-oxobicyclo[2.2.1]hepta-2,5-diene synthesized in accordance with the aforesaid process and the process of Example 7 described later was placed in a 100 ml flask as a cycloolefin monomer and dissolved in 50 ml of THF, following by stirring with a magnetic stirrer bar. To the solution, 113 mg of Mo(N-2,6-Pr$^i_2$C$_6$H$_3$)(CHCMe$_2$)(OBu$^t$)$_2$ was added as a ring-opening metathesis polymerization catalyst, and the reaction mixture was stirred at room temperature for 16 hours. Thereafter, 80 $\mu$l of butylaldehyde was added, and the reaction mixture was stirred for 30 minutes to terminate the reaction. The obtained ring-opening metathesis polymer solution was introduced into methanol and subjected to the same operations as in Example 2 to obtain 4.6 g of a ring-opening metathesis polymer powder (fluorine-containing cycloolefin polymer).

Thereafter, in a 200 ml autoclave, 2 g of the ring-opening metathesis polymer powder was subjected to hydrogenation reaction in the same manner as in Example 2. The obtained hydrogenated ring-opening metathesis polymer was filtered. Then, the hydrogenated ring-opening metathesis polymer was precipitated with methanol and dried to obtain 1.6 g of a white powdery hydrogenated ring-opening metathesis polymer (fluorine-containing cycloolefin polymer).

In the $^1$H-NMR spectrum and the $^{13}$C-NMR spectrum of the obtained fuorine-containing cycloolefin polymer, any peak assigned to a double bond of the main chain and the five-membered ring carbon was not observed, so that the degree of hydrogenation calculated from the $^1$H-NMR spectrum and the $^{13}$C-NMR spectrum was 100%. The weight-average molecular weight Mw as measured with GPC was 30,750, and Mw/Mn was 1.10.

A VUV spectrum of the obtained fuorine-containing cycloolefin polymer was measured in the same manner as in Example 2. The absorption coefficient at 157 nm was 0.16 $\mu$m$^{-1}$.

Example 4

Ring-opening metathesis polymerization was carried out in the same manner as in Example 3, except that 5 g of 5-trifluoromethyl-7-oxobicyclo[2.2.1]hept-2-ene synthesized in accordance with the aforesaid process and the process of Example 7 described later was used as the cycloolefin monomer. Thus, 3.9 g of a ring-opening metathesis polymer powder was obtained.

Thereafter, 2 g of the ring-opening metathesis polymer powder was subjected to hydrogenation reaction in the same manner as in Example 3. The obtained hydrogenated ring-opening metathesis polymer was filtered. Then, the hydrogenated ring-opening metathesis polymer was precipitated with methanol and dried to obtain 1.36 g of a white powdery hydrogenated ring-opening metathesis polymer (fluorine-containing cycloolefin polymer).

In the $^1$H-NMR spectrum of the obtained fuorine-containing cycloolefin polymer, any peak assigned to a proton of the main chain olefin was not observed, so that the degree of hydrogenation calculated from the $^1$H-NMR spectrum was 100%. The weight-average molecular weight Mw as measured with GPC was 27,000, and Mw/Mn was 1.05.

A VUV spectrum of the obtained fuorine-containing cycloolefin polymer was measured in the same manner as in Example 3. The absorption coefficient at 157 nm was 1.082 $\mu$m$^{-1}$.

Example 5

The HOMO energy differences between molecular models of the hydrogenated products of the ring-opening metathesis polymers synthesized in Example 1 to 4, said models being shown in Table 1, were calculated by the use of a molecular orbital method calculation software MOPAC 93.

TABLE 1

| | Fluorine-containing molecular model *1 | HOMO energy *2 (eV) | HOMO energy *3 (eV) | HOMO energy difference |
|---|---|---|---|---|
| Ex. 1 | [structure with H$_3$C, CH$_3$, CF$_3$] | −11.56 | −11.09 | 0.47 |
| Ex. 2 | [structure with H$_3$C, CH$_3$, F$_3$C, CF$_3$] | −11.97 | −11.10 | 0.87 |
| Ex. 3 | [structure with H$_3$C, CH$_3$, O, CF$_3$] | −10.82 | −10.39 | 0.43 |
| Ex. 4 | [structure with H$_3$C, CH$_3$, O, F$_3$C, CF$_3$] | −11.23 | −10.40 | 0.83 |

*1 Fluorine-containing molecular model corresponding to repeated unit structure of fluorine-containing polymer
*2 HOMO energy of fluorine-containing molecular model
*3 HOMO energy of molecular model wherein fluorine is replaced with hydrogen

Comparative Example 1

Ring-opening metathesis polymerization was carried out in the same manner as in Example 3, except that 5 g of 5-methylbicyclo[2.2.1]hept-2-ene was used as the cycloolefin monomer. Thus, 4.9 g of a ring-opening metathesis polymer powder was obtained.

Thereafter, 2 g of the ring-opening metathesis polymer powder was subjected to hydrogenation reaction in the same manner as in Example 3. The obtained hydrogenated ring-opening metathesis polymer was filtered. Then, the hydrogenated ring-opening metathesis polymer was precipitated with methanol and dried to obtain 1.89 g of a white powdery hydrogenated ring-opening metathesis polymer.

In the $^1$H-NMR spectrum of the obtained hydrogenated ring-opening metathesis polymer, any peak assigned to a proton of the main chain olefin was not observed, so that the degree of hydrogenation calculated from the $^1$H-NMR spectrum was 100%. The weight-average molecular weight Mw as measured with GPC was 37,000, and Mw/Mn was 1.09.

A VUV spectrum was measured in the same manner as in Example 3, except that a 2 wt % cyclohexane solution of the obtained hydrogenated ring-opening metathesis polymer was used instead of the 2 wt % metaxylene hexafluoride solution. The absorption coefficient at 157 nm was 23.9 $\mu m^{-1}$.

Comparative Example 2

Ring-opening metathesis polymerization was carried out in the same manner as in Example 3, except that 5 g of 8-cyanotetracyclo[4.4.0.1$^{2,5}$.1$^{7,10}$]-3-dodecene was used as the cycloolefin monomer. Thus, 4.9 g of a ring-opening metathesis polymer powder was obtained.

Thereafter, in a 200 ml autoclave, 2 g of the ring-opening metathesis polymer powder was dissolved in 50 ml of THF, then a THF (30 ml) solution of dichlorotetrakis(triphenylphosphine)ruthenium (2.0 mg) and triethylamine (0.8 mg) having been previously prepared was added as a hydrogenation catalyst, and hydrogenation reaction was carried out at a hydrogen pressure of 8.1 MPa and 165° C. for 5 hours. Then, the temperature was returned to room temperature, and the hydrogen gas was released. The hydrogenated ring-opening metathesis polymer solution was introduced into methanol to precipitate the hydrogenated ring-opening metathesis polymer, followed by filtration and drying in vacuo. Thus, 1.79 g of a white powdery hydrogenated ring-opening metathesis polymer was obtained.

In the $^1$H-NMR spectrum of the obtained hydrogenated ring-opening metathesis polymer, any peak assigned to a proton of the main chain olefin was not observed, so that the degree of hydrogenation calculated from the $^1$H-NMR spectrum was 100%. The weight-average molecular weight Mw as measured with GPC was 60,000, and Mw/Mn was 1.08.

A VUV spectrum was measured in the same manner as in Example 3, except that a 2 wt % THF solution of the obtained hydrogenated ring-opening metathesis polymer was used instead of the 2 wt % metaxylene hexafluoride solution. The absorption coefficient at 157 nm was 32.3 $\mu m^{-1}$.

Comparative Example 3

A 2 wt % metaxylene hexafluoride solution of the ring-opening metathesis polymer powder of 5-trifluoromethylbicyclo[2.2.1]hept-2-ene obtained in Example 1 was prepared without hydrogenation of the polymer powder. The solution was dropped onto a CaF$_2$ substrate and applied with a spin coater at speed of 800 rpm. Then, the coating substrate was dried at 160° C., and a VUV spectrum was measured. The absorption coefficient of the polymer at 157 nm was 33 $\mu m^{-1}$.

Comparative Example 4

A 2 wt % metaxylene hexafluoride solution of the ring-opening metathesis polymer powder of 5,6-bistrifluoromethylbicyclo[2.2.1]hepta-2,5-diene obtained in Example 2 was prepared without hydrogenation of the polymer powder. The solution was dropped onto a CaF$_2$ substrate and applied with a spin coater at speed of 800 rpm. Then, the coating substrate was dried at 160° C., and a VUV spectrum was measured. The absorption coefficient of the polymer at 157 nm was 43 $\mu m^{-1}$.

Example 6

The HOMO energy differences between molecular models shown in Table 2 were calculated by the use of a molecular orbital method calculation software MOPAC 93.

TABLE 2

| | Fluorine-containing molecular model *1 | HOMO energy *2 (eV) | HOMO energy *3 (eV) | HOMO energy difference |
|---|---|---|---|---|
| Ex. 6-1 | [structure] | −11.50 | −11.10 | 0.40 |
| Ex. 6-2 | [structure] | −11.17 | −10.73 | 0.44 |
| Ex. 6-3 | [structure] | −12.20 | −11.10 | 1.10 |

*1 Fluorine-containing molecular model corresponding to repeated unit structure of fluorine-containing polymer
*2 HOMO energy of fluorine-containing molecular model
*3 HOMO energy of molecular model wherein fluorine is replaced with hydrogen Reference Example 1

The HOMO energy differences between molecular models shown in Table 3 were calculated by the use of a molecular orbital method calculation software MOPAC 93.

TABLE 3

| | Fluorine-containing molecular model *1 | HOMO energy *2 (eV) | HOMO energy *3 (eV) | HOMO energy difference |
|---|---|---|---|---|
| Ref. Ex. 1-1 | [structure] | −13.25 | −11.10 | 2.15 |

TABLE 3-continued

| Fluorine-containing molecular model *1 | HOMO energy *2 (eV) | HOMO energy *3 (eV) | HOMO energy difference |
|---|---|---|---|
| Ref. Ex. 1-2  H₃C—CF₂\FC—F\F₂C—CF / F₂C—CH₃ / CF / CF₃ (structure) | −13.32 | −11.09 | 2.23 |

*1 Fluorine-containing molecular model corresponding to repeated unit structure of fluorine-containing polymer
*2 HOMO energy of fluorine-containing molecular model
*3 HOMO energy of molecular model wherein fluorine is replaced with hydrogen

Example 7

(a) Synthesis of 5,6-difluoro-5,6-bistrifluoromethyl-7-bicyclo[2.2.1]hept-2-ene

In a 70 ml autoclave, 6.3 g of dicyclopentadiene, 150 mg of hydroquinone and 20 g of octafluoro-2-butene were placed, and heated at 90° C. for 1 hour. Then, the resulting reaction solution was subjected to precision distillation to obtain 6.8 g of 5,6-difluoro-5,6-bistrifluoromethyl-7-bicyclo[2.2.1]hept-2-ene.

$^1$H-NMR (δ in CDCl₃): 6.31 (2H, s), 3.30&3.23 (2H, s&s), 2.27&2.00 (2H, m&m); $^{13}$C-NMR (δ ppm in CDCl₃): 135.1 (dt), 134.4 (d), 133.9 (m), 122.3 (ddq, $J_{CF}$=282.8 Hz), 122.0 (dq, $J_{CF}$=282.3 Hz), 103–100 (m), 100–97 (m), 48.6 (d), 46.9 (d), 45.0 (bs)

(b) Synthesis of 5,6-difluoro-5-trifluoromethyl-6-pentafluoroethyl-7-bicyclo[2.2.1]hept-2-ene In a 70 ml autoclave, 6.3 g of dicyclopentadiene, 150 mg of hydroquinone and 25 g of decafluoro-2-pentene were placed, and stirred at room temperature for 5 days. Then, the resulting reaction solution was subjected to precision distillation to obtain 8.7 g of 5,6-difluoro-5-trifluoromethyl-6-pentafluoroethyl-7-bicyclo[2.2.1]hept-2-ene.

$^1$H-NMR (δ in CDCl₃): 6.33&6.29 (2H, s&s), 3.48, 3.30&3.22 (2H, s, s&s), 2.25&1.90 (2H, m&d); $^{13}$C-NMR (δ ppm in CDCl₃): 135.3 (m), 135.0 (m), 134.2 (dt), 122.0 (tq, $J_{CF}$=281.6 Hz), 118.8 (dq, $J_{CF}$=287.8 Hz), 112.0 (m), 104–101 (m), 101–98 (m), 49.5 (m), 49.2 (m), 48.3 (d), 47.5 (quint), 47.2 (quint), 46.6 (d), 44.7 (d), 44.7 (bs)

(c) Synthesis of 5-fluoro-5-pentafluoroethyl-6,6-bistrifluoromethyl-7-bicyclo[2.2.1]hept-2-ene In a 70 ml autoclave, 2.6 g of cyclopentadiene and 20 g of perfluoro-2-methyl-2-pentene were placed, and heated at 60° C. for 4 hours. Then, the resulting reaction solution was subjected to precision distillation to obtain 7.0 g of 5-fluoro-5-pentafluoroethyl-6,6-bistrifluoromethyl-7-bicyclo[2.2.1]hept-2-ene.

$^1$H-NMR (δ in CDCl₃): 6.50, 6.39&6.29 (2H, m, m&m), 3.52&3.38 (2H, d&s), 2.43, 2.25&1.84 (2H, dd, d&m); $^{13}$C-NMR (δ ppm in CDCl₃): 138.9 (s,), 138.0 (s), 135.2 (t), 134.2 (dd), 123.7 (dq, $J_{CF}$=285.8 Hz), 123.4 (tq, $J_{CF}$=282.9 Hz), 123.2 (qq, $J_{CF}$=285.0 Hz), 121.3 (mt, $J_{CF}$=283.9 Hz), 114–103 (m), 68.5 (m), 51.1 (m), 50.8 (m), 50.3 (m), 49.9 (m), 48.0 (s), 47.8 (d), 45.8 (bs)

(d) Synthesis of 5,6-difluoro-5-trifluoromethyl-6-heptafluoroisopropyl-7-bicyclo[2.2.1]hept-2-ene In a 70 ml autoclave, 6.0 g of dicyclopentadiene, 150 mg of hydroquinone and 30 g of perfluoro-4-methyl-2-pentene were placed, and heated at 180° C. for 12 hours. Then, the resulting reaction solution was subjected to precision distillation to obtain 6.5 g of 5,6-difluoro-5-trifluoromethyl-6-heptafluoroisopropyl-7-bicyclo[2.2.1]hept-2-ene.

$^1$H-NMR (δ in CDCl₃): 6.37, 6.30&6.26 (2H, s, s&m), 3.63, 3.40, 3.29&3.23 (2H, s, s, s&d), 2.23&1.94 (2H, m&m); $^{13}$C-NMR (δ ppm in CDCl₃): 135.8 (d), 135.3 (t), 134.8 (d), 134.7 (d), 122.5 (mq, $J_{CF}$=281.1 Hz), 122.0 (dq, $J_{CF}$=282.9 Hz), 120.9 (mq, $J_{CF}$=286.2 Hz), 120.3 (dq, $J_{CF}$=287.5 Hz), 120.2 (mq, $J_{CF}$=287.9 Hz), 105–89 (m), 51.1 (d), 49.6 (d), 49.5 (d), 47.8 (d), 43.9 (s)

(e) Synthesis of 5,6,6,7,7,8,8,9-octafluorotricyclo [5.2.1.0$^{5,9}$]deca-2-ene

In a 50 ml autoclave equipped with a magnetic stirring device, 12.27 g of cyclopentadiene, 39.38 g of perfluorocyclopropene and 0.29 g of hydroquinone were placed, and the autoclave was pressurized with nitrogen. After stirring at 150° C. for 72 hours, the resulting reaction solution was subjected to precision distillation to obtain 18.27 g of 5,6,6,7,7,8,8,9-octafluorotricyclo[5.2.1.0$^{5,9}$]deca-2-ene.

$^1$H-NMR (δ in CDCl₃): 6.46 (2H, s), 6.11 (2H, s), 3.38 (2H, s), 3.23 (2H, s), 2.44 (1H, d), 2.19 (1H, d), 1.80 (2H, m); $^{13}$C-NMR (δ ppm in CDCl₃): 136.6 (m), 135.1 (m), 114.1 (m, $J_{CF}$=279.0 Hz), 113.2 (m, $J_{CF}$=275.8 Hz), 98.9 (m, $J_{CF}$=223.9 Hz), 48.9 (m), 45.1 (m), 41.4 (m)

(f) Synthesis of 5,6-bis-nonafluorobutyl-bicyclo [2.2.1]hept-2-ene

In a nitrogen atmosphere, 16.74 g of trans-5H,6H-octadecafluoro-5-decene, 7.154 g of cyclopentadiene and 0.150 g of hydroquinone were placed in a 50 ml pressure-resistant vessel, and stirred at 70° C. for 44 hours. The reaction solution was allowed to stand still to separate the solution into two layers, and the lower layer was subjected to vacuum distillation to obtain 9.558 g of 5,6-bis-nonafluorobutyl-bicyclo[2.2.1]hept-2-ene.

$^1$H-NMR (δ in C₆D₆): 1.30 (1H, d), 1.45 (1H, d), 2.39 (1H, d), 2.92 (1H, m), 2.96 (1H, d), 2.97 (1H, m), 5.94 (2H, m); $^{13}$C-NMR (δ ppm in C₆D6): 43.19 (t), 43.46 (m), 43.46 (m), 43.89 (dd), 44.41 (m), 48.19 (d), 109.71 (t, $J_{CF}$=267 Hz), 111.90 (m, $J_{CF}$=264 Hz), 117.9 (tt, $J_{CF}$=256 Hz), 118.3 (qt, $J_{CF}$=286 Hz), 136.1 (d), 136.4 (s)

Example 8

In a nitrogen atmosphere, 3 g of 5,6-difluoro-5-trifluoromethyl-6-pentafluoroethyl-7-bicyclo[2.2.1]hept-2-ene synthesized in Example 7 was placed in a 100 ml flask and dissolved in 24 g of metaxylene hexafluoride, followed by stirring with a magnetic stirrer bar. To the solution, 79.2 mg of Mo(N-2,6-Pr$^i$₂C₆H₃)(CHBu$^r$)(OCMe(CF₃)₂)₂ was added, and the reaction was carried out at room temperature for 3 days. Thereafter, 34 mg of butylaldehyde was added, and the reaction mixture was stirred for 30 minutes to terminate the reaction.

The obtained ring-opening metathesis polymer solution was introduced into 500 ml of methanol to precipitate a ring-opening metathesis polymer, and the polymer was filtered, washed with methanol and dried in vacuo to obtain 3.0 g of a ring-opening metathesis polymer powder.

Thereafter, in a 70 ml autoclave, 1.7 g of the ring-opening metathesis polymer powder was dissolved in THF, then 3 g of 5% Rh/C was added, and hydrogenation reaction was carried out at a hydrogen pressure of 10 MPa and 100° C. for 178 hours. Then, the temperature was returned to room temperature, and the hydrogen gas was released. The hydrogenated ring-opening metathesis polymer was filtered and Rh/C was removed therefrom, and then the filtrate was introduced into methanol to precipitate the hydrogenated product of the ring-opening metathesis polymer, followed by filtration separation and drying in vacuo. Thus, 1.6 g of a white powdery hydrogenated ring-opening metathesis polymer (fluorine-containing cycloolefin polymer) was obtained.

Figure 3:
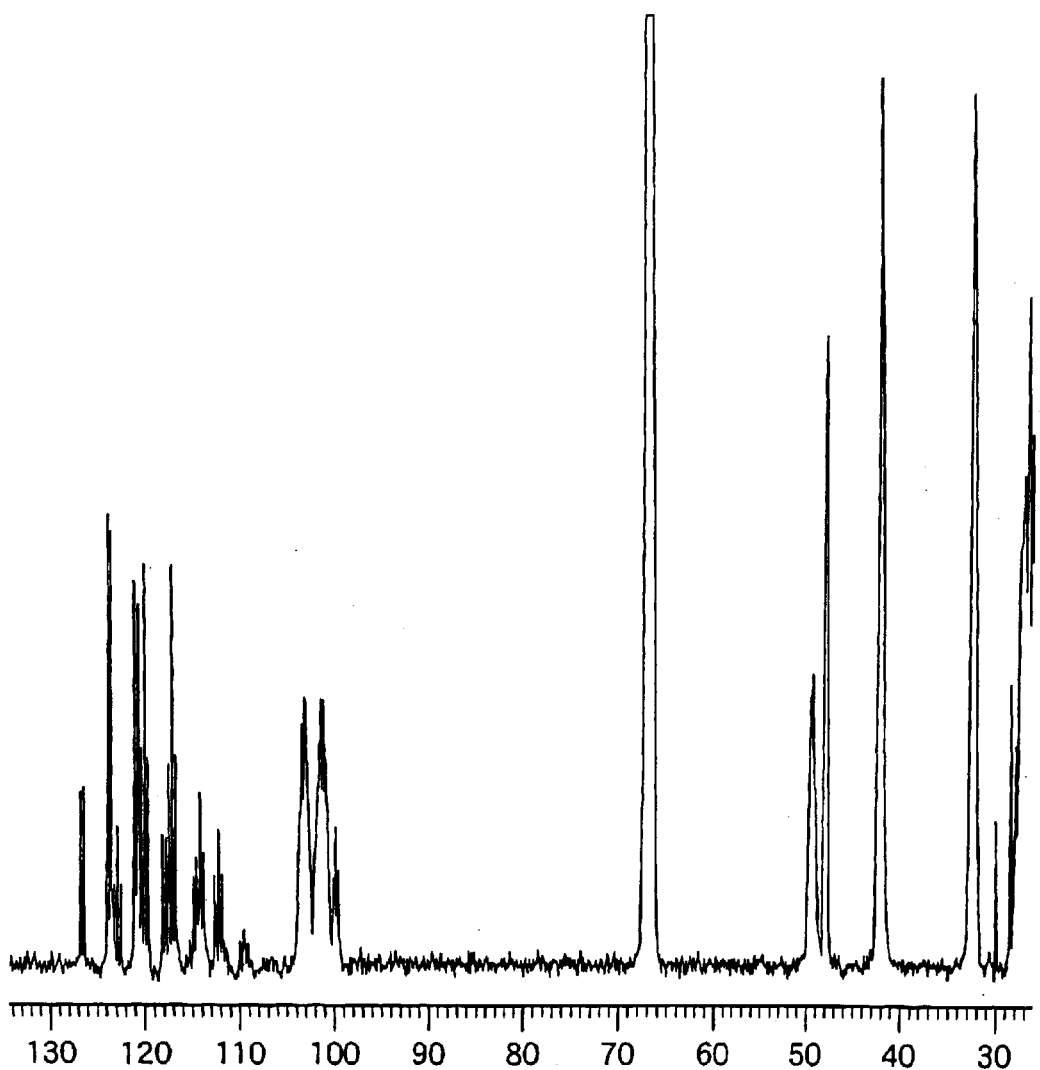
FIG. 3 shows a $^{13}$C-NMR spectrum of a fluorine-containing cycloolefin polymer of Example 8.

In the $^1$H-NMR spectrum and the $^{13}$C-NMR spectrum (shown in FIG. 3) of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 27,800, and Mw/Mn was 1.29.

Figure 2:
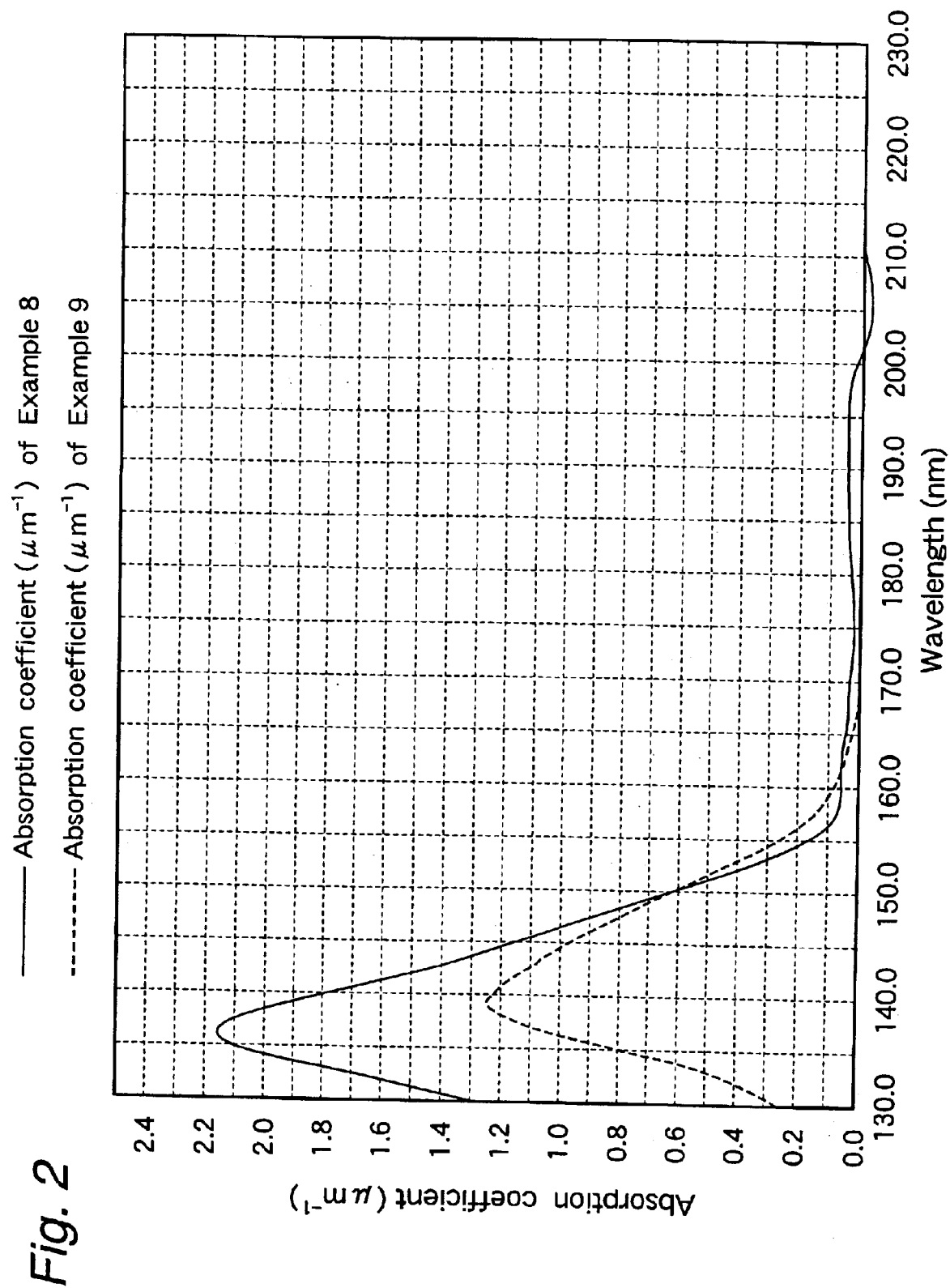
FIG. 2 shows VUV spectra of fluorine-containing cycloolefin polymers of Example 8 and Example 9.

A 6 wt % metaxylene hexafluoride solution of the obtained fuorine-containing cycloolefin polymer was prepared, and the solution was dropped onto a CaF$_2$ substrate and applied with a spin coater at speed of 500 rpm. Then, the coating substrate was dried in vacuo at 100° C., and a VUV spectrum was measured. The spectrum is shown in FIG. 2. The absorption coefficient at 157 nm was 0.086 $\mu$m$^{-1}$.

$^{13}$C-NMR ($\delta$ ppm in THF-d$_8$): 122.9 (dq, J$_{CF}$=283.5), 104–102 (m), 102–99 (m), 48.6 (d), 48.5 (d), 42.7 (d), 33.3 (bs), 29.6 (s), 27.8 (m), 27.4 (m), 26.8 (bs), 26.3 (m)

Example 9

In a nitrogen atmosphere, 3 g of 5,6-difluoro-5,6-bistrifluoromethyl-7-bicyclo[2.2.1]hept-2-ene synthesized in Example 7 was placed in a 100 ml flask and dissolved in 24 g of metaxylene hexafluoride, followed by stirring with a magnetic stirrer bar. To the solution, 103 mg of W(N-2,6-Pr$^i{}_2$C$_6$H$_3$)(CHCHCMe$_2$)(OCMe(CF$_3$)$_2$)$_2$(P(OMe)$_3$) was added, and the reaction was carried out at room temperature for 2 days. Thereafter, 41 mg of butylaldehyde was added, and the reaction mixture was stirred for 30 minutes to terminate the reaction. The obtained ring-opening metathesis polymer solution was introduced into methanol and subjected to the same operations as in Example 8 to obtain 3.0 g of a ring-opening metathesis polymer powder.

Thereafter, in a 70 ml autoclave, 0.5 g of the ring-opening metathesis polymer powder was dissolved in THF, then 2 g of 5% Rh/C was added, and hydrogenation reaction was carried out at 140° C. for 120 hours. Then, the same operations as in Example 8 were carried out to obtain 0.45 g of a white powdery hydrogenated ring-opening metathesis polymer (fluorine-containing cycloolefin polymer).

Figure 4:
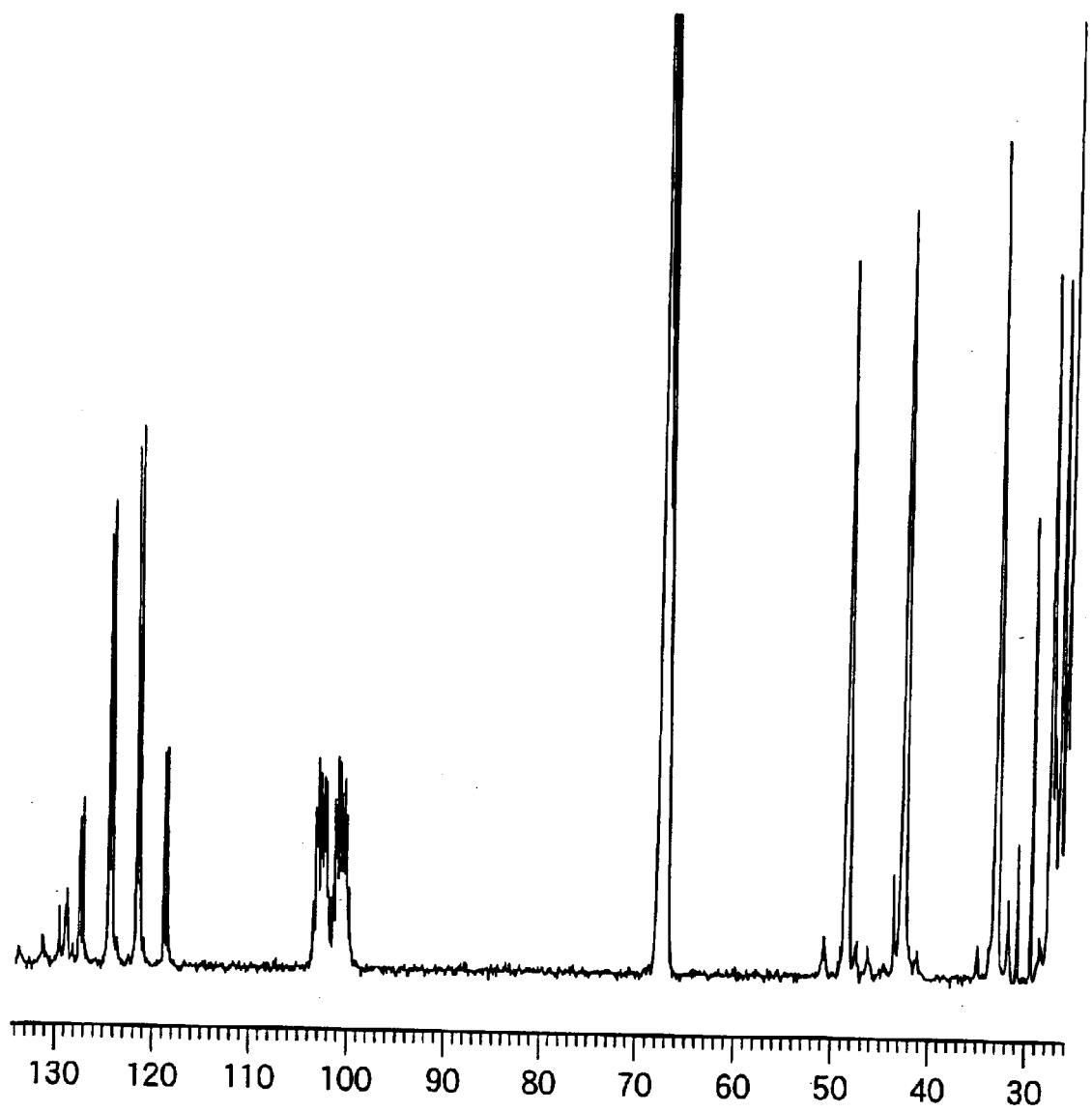
FIG. 4 shows a $^{13}$C-NMR spectrum of a fluorine-containing cycloolefin polymer of Example 9.

In the $^1$H-NMR spectrum and the $^{13}$C-NMR spectrum (shown in FIG. 4) of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 22,300, and Mw/Mn was 1.28.

The obtained fuorine-containing cycloolefin polymer was applied onto a CaF$_2$ substrate in the same manner as in Example 8, and a VUV spectrum was measured. The spectrum is shown in FIG. 2. The absorption coefficient at 157 nm was 0.169 $\mu$m$^{-1}$.

$^{13}$C-NMR ($\delta$ ppm in THF-d$_8$): 122.2 (dp, J$_{CF}$=285.7), 118.5 (tq, J$_{CF}$=288.2), 112.2 (mt, J$_{CF}$=264.2), 104–102 (m), 102–100 (m), 100–99 (m), 48.8 (m), 47.3 (bd), 41.5 (m), 32.3 (m), 28.6 (s), 28–25 (m)

Example 10

In a nitrogen atmosphere, 4 g of 5-fluoro-5-pentafluoroethyl-6,6-bistrifluoromethyl-7-bicyclo[2.2.1]hept-2-ene synthesized in Example 7 was placed in a 100 ml flask and dissolved in 32 g of metaxylene hexafluoride, followed by stirring with a magnetic stirrer bar. To the solution, 103 mg of W(N-2,6-Pr$^i{}_2$C$_6$H$_3$)(CHCHCMe$_2$)(OCMe(CF$_3$)$_2$)$_2$(P(OMe)$_3$) was added, and the reaction was carried out at room temperature for 3 days. Thereafter, 41 mg of butylaldehyde was added, and the reaction mixture was stirred for 30 minutes to terminate the reaction. The obtained ring-opening metathesis polymer solution was introduced into methanol and subjected to the same operations as in Example 8 to obtain 1.3 g of a ring-opening metathesis polymer powder.

Thereafter, in a 70 ml autoclave, 1.0 g of the ring-opening metathesis polymer powder was dissolved in THF, then 0.5 g of 5% Rh/Al$_2$O$_3$ was added as a hydrogenation catalyst, and hydrogenation reaction was carried out at a hydrogen pressure of 12 MPa and 140° C. for 86 hours. Then, the same operations as in Example 8 were carried out to obtain 0.9 g of a white powdery hydrogenated ring-opening metathesis polymer (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 9,800, and Mw/Mn was 1.09.

The obtained fuorine-containing cycloolefin polymer was applied onto a CaF$_2$ substrate in the same manner as in Example 8, and a VUV spectrum was measured. The absorption coefficient at 157 nm was 0.223 $\mu$m$^{-1}$.

Example 11

In a nitrogen atmosphere, 3 g of 5,6-difluoro-5-trifluoromethyl-6-heptafluoroisopropyl-7-bicyclo[2.2.1]hept-2-ene synthesized in Example 7 was placed in a 100 ml flask and dissolved in 28 g of metaxylene hexafluoride, followed by stirring with magnetic stirrer bar. To the solution, 79.3 mg of Mo(N-2,6-Pr$^i{}_2$C$_6$H$_3$)(CHBu$^t$)(OCMe(CE$_3$)$_2$)$_2$ was added, and the reaction was carried out at room temperature for 3 days. Thereafter, 36 mg of butylaldehyde was added, and the reaction mixture was stirred for 30 minutes to terminate the reaction. The obtained ring-opening metathesis polymer solution was introduced into methanol and subjected to the same operations as in Example 10 to obtain 2.5 g of a ring-opening metathesis polymer powder.

Thereafter, in a 70 ml autoclave, 0.9 g of the ring-opening metathesis polymer powder was dissolved in THF, then 0.5 g of 5% Rh/Al$_2$O$_3$ was added, and hydrogenation reaction was carried out at a hydrogen pressure of 11 MPa and 140° C. for 66 hours. Then, the same operations as in Example 10 were carried out to obtain 0.8 g of a white powdery hydrogenated ring-opening metathesis polymer (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed, and the degree of hydrogenation calculated from the $^1$H-NMR spectrum and the $^{13}$C-NMR spectrum was 100%. The weight-average molecular weight Mw as measured with GPC was 15,000, and Mw/Mn was 1.05.

The obtained hydrogenated ring-opening metathesis polymer was applied onto a CaF$_2$ substrate in the same manner as in Example 10, and a VUV spectrum was measured. The absorption coefficient at 157 nm was 0.187 $\mu m^{-1}$.

Example 12

In a nitrogen atmosphere, 7.042 g of 5,6,6,7,7,8,8,9-octafluorotricyclo[5.2.1.0$^{5.9}$]deca-2-ene synthesized in Example 7 was placed in a 100 ml flask and dissolved in 50 g of metaxylene hexafluoride, followed by stirring with a magnetic stirrer bar. To the solution, 178 mg of Mo(N-2,6-Pr$^i_2$C$_6$H$_3$)(CHBu$^t$)(OCMe(CF$_3$)$_2$)$_2$ was added, and the reaction was carried out at room temperature for 64 hours. Thereafter, 82 mg of butylaldehyde was added, and the reaction mixture was stirred for 30 minutes to terminate the reaction. From the obtained ring-opening metathesis polymer solution, the solvent was distilled off under reduced pressure, and the remainder was dissolved in 20 ml of acetone. The resulting solution was introduced into methanol-water (methanol:water=1:1) and subjected to the same operations as in Example 10 to obtain 5.64 g of a ring-opening metathesis polymer powder.

Thereafter, in a 70 ml autoclave, 2 g of the ring-opening metathesis polymer powder was dissolved in THF, and hydrogenation reaction was carried out in the same manner as in Example 10 except for replacing the 5% Rh/Al$_2$O$_3$ with 0.7 g of Rh black. Then, the same operations as in Example 10 were carried out to obtain 1.6 g of a white powdery hydrogenated ring-opening metathesis polymer (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 23,000, and Mw/Mn was 1.19.

The obtained fuorine-containing cycloolefin polymer was applied onto a CaF$_2$ substrate in the same manner as in Example 10, and a VUV spectrum was measured. The absorption coefficient at 157 nm was 0.126 $\mu m^{-1}$.

Example 13

In a nitrogen atmosphere, 2.1 g of 5,6-bis(nonafluorobutyl)-bicyclo[2.2.1]hept-2-ene synthesized in Example 7 was placed in a 50 ml flask and dissolved in 18.2 g of trifluoromethylbenzene, followed by stirring with a magnetic stirrer bar. To the solution, 26.2 mg of Mo(N-2,6-Pr$^i_2$C$_6$H$_3$)(CHCMe$_3$)(OCMe(CF$_3$)$_2$)$_2$ was added, and the reaction was carried out at room temperature for 6 hours. Thereafter, 14 mg of butylaldehyde was added, and the reaction mixture was stirred for 30 minutes to terminate the reaction. The obtained ring-opening metathesis polymer solution was introduced into a methanol-1N hydrochloric acid mixed solution (methanol:1N hydrochloric acid=100:1) and subjected to the same operations as in Example 10 to obtain 2.0 g of a ring-opening metathesis polymer powder.

Thereafter, in a 70 ml autoclave, 2 g of the ring-opening metathesis polymer powder was dissolved in THF, and hydrogenation reaction was carried out in the same manner as in Example 10. Then, the same operations as in Example 10 were carried out to obtain 1.9 g of a white powdery hydrogenated ring-opening metathesis polymer (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 53,000, and Mw/Mn was 1.10.

The obtained fuorine-containing cycloolefin polymer was applied onto a CaF$_2$ substrate in the same manner as in Example 10, and a VUV spectrum was measured. The absorption coefficient at 157 nm was 0.091 $\|m^{-1}$.

Example 14

The fluorine-containing cycloolefin polymer synthesized in Example 8 was dissolved in metaxylene hexafluoride to give a 5 wt % solution. The solution was filtered through a membrane filter (pore diameter: 1.0 $\mu$m) made of Teflon (registered trademark) to prepare a coating solution. The solution was applied to a glass substrate with a spin coater at speed of 800 rpm to give a uniform thin membrane, and then heated at 80° C. for 5 hours under vacuum to obtain a transparent membrane on the glass substrate.

An aluminum frame (inner diameter: 2 cm) of a pellicle frame coated with an adhesive layer was heated and press bonded to the above film. After completion of the bonding, the pellicle frame was separated from the glass substrate to obtain a uniform thin membrane having a thickness of 0.8 $\mu$m.

Figure 5:
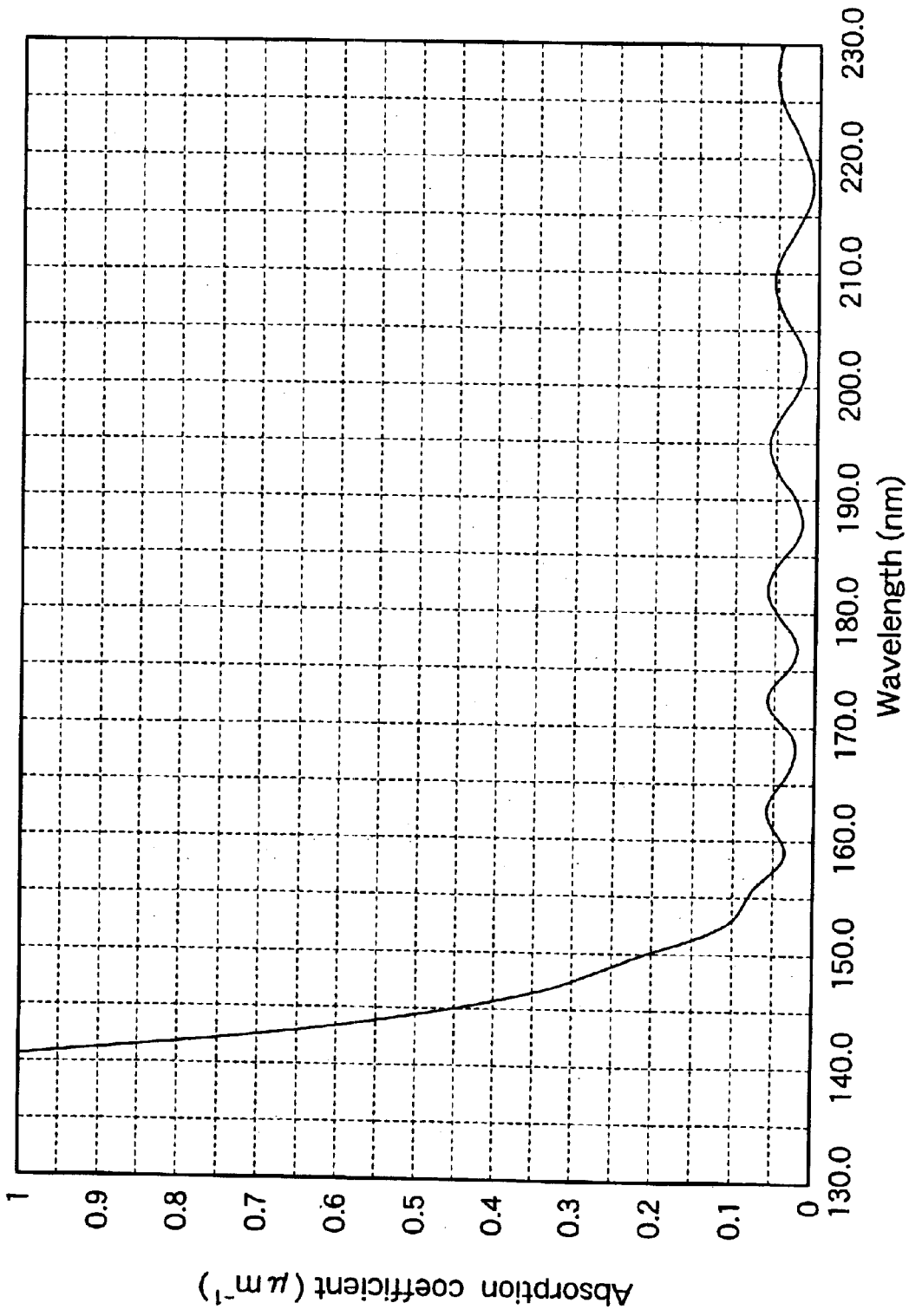
FIG. 5 shows a VUV spectrum of a pellicle membrane formed from a fluorine-containing cycloolefin polymer of Example 14.
Figure 6:
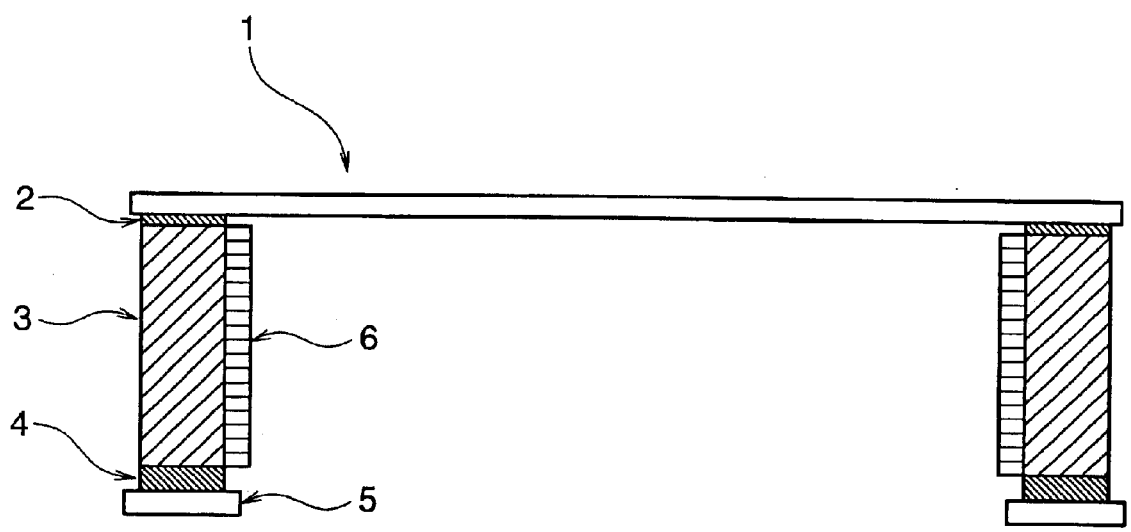
FIG. 6 is a simple structural view of a pellicle.

A UVU spectrum of the resulting thin membrane was measured. The spectrum is shown in FIG. 5. The absorption coefficient at 157 nm was 0.050 $\mu m^{-1}$.

Example 15

In a nitrogen atmosphere, 3 g of 5,6-difluoro-5-trifluoromethyl-6-pentafluoroethyl-7-bicyclo[2.2.1]hept-2-ene and 1 g of decafluorocyclohexene were placed in a 100 ml flask and dissolved in 24 g of metaxylene hexafluoride, following by stirring with a magnetic stirrer bar. To the solution, 110 mg of W(N-2,6-Pr$^i_2$C$_6$H$_3$)(CHCHCMe$_2$)(OC(CF$_3$)$_3$)$_2$(P(OMe)$_3$) was added, and the reaction was carried out at room temperature for 3 days. Thereafter, 34 mg of butylaldehyde was added, and the reaction mixture was stirred for 30 minutes to terminate the reaction.

The obtained ring-opening metathesis polymer solution was introduced into 500 ml of methanol to precipitate a ring-opening metathesis polymer, and the polymer was filtered, washed with methanol and dried in vacuo to obtain 3.5 g of a ring-opening metathesis polymer powder.

Thereafter, in a 70 ml autoclave, 3.0 g of the ring-opening metathesis polymer powder was dissolved in THF, then 3 g of 5% Rh/C was added, and hydrogenation reaction was carried out at a hydrogen pressure of 10 MPa and 100° C. for 120 hours. Then, the same operations as in Example 8 were carried out to obtain 3.0 g of a white powdery hydrogenated ring-opening metathesis polymer (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 35,200, and Mw/Mn was 1.30.

A 6 wt % metaxylene hexafluoride solution of the obtained fuorine-containing cycloolefin polymer was prepared, and the solution was dropped onto a CaF$_2$ substrate and applied with a spin coater at speed of 500 rpm. Then, the coating substrate was dried in vacuo at 100° C., and a VUV spectrum was measured. The absorption coefficient at 157 nm was 0.043 $\mu m^{-1}$.

Example 16

A ring-opening metathesis polymer powder of 4.3 g was obtained in the same manner as in Example 15, except that 1.5 g of perfluorobicyclo[2.2.1]hept-2,5-ene was used instead of 1 g of decafluorocyclohexene.

Thereafter, in a 70 ml autoclave, 3.0 g of the ring-opening metathesis polymer powder was dissolved in THF, and hydrogenation reaction was carried out in the same manner as in Example 15 to obtain 3.0 g of a white powdery hydrogenated ring-opening metathesis polymer (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 43,400, and Mw/Mn was 1.27.

A 6 wt % metaxylene hexafluoride solution of the obtained fuorine-containing cycloolefin polymer was prepared, and the solution was dropped onto a $CaF_2$ substrate and applied with a spin coater at speed of 500 rpm. Then, the coating substrate was dried in vacuo at 100° C., and a VUV spectrum was measured. The absorption coefficient at 157 nm was 0.039 $\mu m^{-1}$.

Example 17

A ring-opening metathesis polymer of 4.5 g was obtained in the same manner as in Example 15, except that 1.5 g of 6-trifluoromethyl-7-oxobicyclo[2.2.1]-hept-2-ene-5-carbocylic acid-1,1-bis(trifluoromethyl)ethyl ester was used instead of 1 g of decafluorocyclohexene. Thereafter, in a 70 ml autoclave, 3.0 g of the ring-opening metathesis polymer powder was dissolved in THF, and hydrogenation reaction was carried out in the same manner as in Example 15 to obtain 3.0 g of a white powdery hydrogenated ring-opening metathesis polymer (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 38,900, and Mw/Mn was 1.35.

A 6 wt % metaxylene hexafluoride solution of the obtained fuorine-containing cycloolefin polymer was prepared, and the solution was dropped onto a $CaF_2$ substrate and applied with a spin coater at speed of 500 rpm. Then, the coating substrate was dried in vacuo at 100° C., and a VUV spectrum was measured. The absorption coefficient at 157 nm was 1.23 $\mu m^{-1}$.

Example 18

In 15 g of propylene glycol monomethyl ether acetate, 2.0 g of the fluorine-containing cycloolefin polymer obtained in Example 17 and 0.04 g of bis(p-tert-butylphenyl)iodonium trifluoromethanesulfonate were dissolved, and the solution was filtered through a microfilter of 0.1 $\mu m$ to prepare a positive photoresist solution.

Then, the photoresist solution was applied to a silicon wafer by a spin coater and dried at 110° C. for 90 seconds on a hot plate to form a positive photoresist layer having a thickness of 0.5 $\mu m$.

The photoresist layer was selectively irradiated with an ArF excimer laser beam (193 nm) by the use of an ArF exposure device (manufactured by Nikon K.K., NA=0.55), then heated at 100° C. for 90 seconds, developed with a 2.38 wt % tetramethylammonium hydroxide aqueous solution for 60 seconds, washed with distilled water for 30 seconds and dried to obtain a resist pattern profile.

The exposure time in which the ratio between the line and space of 0.18 $\mu m$ formed by the above operations became 1:1 was measured in terms of sensitivity ($mJ/cm^2$, energy quantity), and as a result, it was 25 $mJ/cm^2$.

The sectional shape of the resist pattern of 0.18 $\mu m$ formed as above was observed by a photomicrograph of SEM (scanning type electron microscope, manufactured by Hitachi. Ltd., S-4500). As a result, the resist pattern had a rectangular shape perpendicular to the substrate, and there was no pattern inversion.

The polymer has proved to be useful as a resist polymer for a F2 laser beam because it has sufficient transparency at the F2 wavelength (157 nm) and exhibits excellent pattern-forming agility in the ArF exposure as described above.

Example 19

The fluorine-containing cycloolefin polymer synthesized in Example 8 was dissolved in metaxylene hexafluoride to give a 5 wt % solution, and the solution was filtered through a membrane filter (pore diameter: 1.0 $\mu m$) made of Teflon (registered trademark) to prepare a coating solution.

The solution was uniformly applied to a glass substrate (size: 200 mm×200 mm) by a spin coater at 800 rpm.

Then, the coating substrate was dried at 80° C. for 5 hours under vacuum to remove the solvent, whereby a transparent fluorine-containing cycloolefin polymer membrane was obtained on the glass plate. Thereafter, by the use of a provisional frame (external size: 220 mm square, internal size: 180 mm square) made of an ABS resin, the above-obtained polymer membrane was separated from the glass substrate and a self-supporting membrane made of only the polymer was prepared. The thickness of the polymer membrane was 0.8 $\mu m$.

One side surface of an aluminum alloy pellicle frame (size: long side 149 mm×short side 124 mm×height 6.3 mm, wall thickness: 2 mm) was coated with a fluorine type adhesive, and the fluorine-containing cycloolefin polymer membrane was transferred to the pellicle frame from the provisional frame to prepare a pellicle. A VUV spectrum of the thus obtained pellicle membrane was measured. The absorption coefficient at 157 nm was 0.050 $\mu m^{-1}$.

Utilizing the obtained pellicle as a dust-proofing film of a mask, a resist pattern of 0.18 mm was formed by an ArF exposure device (manufactured by Nikon K.K., NA=0.55) in the same manner as in Example 18. As a result, the resist pattern had a rectangular shape perpendicular to the substrate, and there was no pattern inversion. The fluorine-containing cycloolefin polymer of the invention has proved to be useful as a resist polymer for a F2 laser beam because it has sufficient transparency at the F2 wavelength (157 nm) and exhibits excellent pattern-forming ability in the ArF exposure as described above.

After exposure to a laser beam of a wavelength of 157 nm at 64 $mJ/cm^2$, a VUV spectrum was measured. The absorption coefficient was 0.050 $\mu m^{-1}$, and no change was observed, so that this polymer proved to be free from lowering of transparency caused by deterioration of the polymer and proved to have excellent light resistance.

Example 20

Ring-opening metathesis polymerization and hydrogenation reaction were carried out in the same manner as in Example 15, except that 3-trifluoromethyl-7-bicyclo[2.2.1]hept-2-ene-3-carboxylic acid-tert-butyl ester was used instead of 5,6-difluoro-5-trifluoromethyl-6-pentafluoroethyl-7-bicyclo[2.2.1]hept-2-ene, 5,6-bistrifluoromethyl-7-oxobicyclo[2.2.1]hepta-2,5-diene was used instead of decafluorocyclohexene, and the amount of $W(N-2,6-Pr^i_2C_6H_3)(CHCHCMe_2)(OC(CF_3)_3)_2(P(OMe)_3)$ used as the catalyst was changed to 250 mg. Thus, 2.3 g of a white powdery hydrogenated ring-opening metathesis polymer (fluorine-containing cycloolefin polymer) was obtained.

In the $^1$H-NMR spectrum and the $^{13}$C-NMR spectrum of the obtained fuorine-containing cycloolefin polymer, any peak assigned to a double bond of the main chain carbon was not observed, so that the degree of hydrogenation calculated from the $^1$H-NMR spectrum and the $^{13}$C-NMR spectrum was 100%. The weight-average molecular weight Mw as measured with GPC was 18,200, and Mw/Mn was 1.27.

In a 500 ml flask, 2.0 g of the fluorine-containing cycloolefin polymer was added to a solution consisting of 200 ml of metaxylene hexafluoride and 0.4 ml of trifluoroacetic acid, and they were stirred at 70° C. for 1 hour. After the solvent was distilled off, the remainder was dissolved in metaxylene hexafluoride, and the resulting solution was added to methanol to precipitate the polymer. The polymer was filtered and dried in vacuo to obtain 1.6 g of a white powdery hydrogenated product of the ring-opening metathesis polymer having been partially hydrolyzed. In the resulting polymer, 15 mol % of ester groups were hydrolyzed. The number-average molecular weight Mn of the hydrogenated product of the partially hydrolyzed ring-opening metathesis polymer, as measured with GPC, was 16,900, and Mw/Mn was 1.29.

A 6 wt % metaxylene hexafluoride solution of the resulting partially hydrolyzed fluorine-containing cycloolefin polymer hydrogenated product was prepared, and the solution was dropped onto a $CaF_2$ substrate and applied with a spin coater at speed of 500 rpm. Then, the coating was dried in vacuo at 100° C., and a VUV spectrum was measured. The absorption coefficient at 157 nm was 1.42 $\mu m^{-1}$.

Example 21

In 13 g of propylene glycol monomethyl ether acetate, 2.0 g of the fluorine-containing cycloolefin polymer obtained in Example 20 and 0.02 g of triphenylsulfonium trifluorate were dissolved, and the solution was filtered through a microfilter of 0.1 $\mu$m to prepare a positive photoresist solution.

Then, the photoresist solution was applied to a silicon wafer by a spin coater and dried at 110° C. for 90 seconds on a hot plate to form a positive photoresist layer having a thickness of 0.5 $\mu$m. The photoresist layer was selectively irradiated with an ArF excimer laser beam (193 nm) by the use of an ArF exposure device (manufactured by Nikon K.K., NA=0.55), then heated at 100° C. for 90 seconds, developed with a 2.38 wt % tetramethylammonium hydroxide aqueous solution for 60 seconds, washed with distilled water for 30 seconds and dried to obtain a resist pattern profile.

The exposure time in which the ratio between the line and space of 0.18 $\mu$m formed by the above operations became 1:1 was measured in terms of sensitivity (mJ/cm$^2$, energy quantity), and as a result, it was 20 mJ/cm$^2$.

The sectional shape of the resist pattern of 0.18 $\mu$m formed as above was observed by a photomicrograph of SEM (scanning type electron microscope, manufactured by Hitachi. Ltd., S-4500). As a result, the resist pattern had a rectangular shape perpendicular to the substrate, and there was no pattern inversion.

The fluorine-containing cycloolefin polymer of the invention has proved to be useful as a resist polymer for a F2 laser beam because it has sufficient transparency at the F2 wavelength (157 nm) and exhibits excellent pattern-forming ability in the ArF exposure as described above.

Example 22

In 24 g of metaxylene hexafluoride, 3 g of 5,6-difluoro-5-trifluoromethyl-6-pentafluoroethyl-7-bicyclo[2.2.1]hept-2-ene was dissolved in the same manner as in Example 8. To the solution, 79.2 mg of $Mo(N-2,6-Pr^i_2C_6H_3)(CHBu^t)(OCMe(CF_3)_2)_2$ was added, and the reaction was carried out at room temperature for 3 days. Thereafter, 34 mg of butylaldehyde was added, and the reaction mixture was stirred for 30 minutes to terminate the reaction. Then, the obtained ring-opening metathesis polymer solution was subjected to the same operations as in Example 8 to precipitate a ring-opening metathesis polymer, and the polymer was filtered, washed with methanol and dried in vacuo to obtain 3.0 g of a ring-opening metathesis polymer powder.

Thereafter, in a 100 ml Teflon-lining autoclave, 2.7 g of the ring-opening metathesis polymer powder was dissolved in metaxylene hexafluoride. Then, 0.35 g of a hydrogen fluoride gas was introduced, and the autoclave was pressurized with nitrogen to perform addition reaction at 30° C. for 100 hours. After the autoclave was purged with nitrogen at room temperature, the remaining hydrogen fluoride gas was replaced with nitrogen at 50° C. and thereby released. The reaction solution was introduced into methanol to precipitate a hydrogen fluoride addition product of the ring-opening metathesis polymer, and the addition product was sufficiently washed with water and hot water, separated by filtration and dried in vacuo to obtain 2.8 g of a white powdery ring-opening metathesis polymer hydrogen fluoride addition product (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed. The weight-average molecular weight Mw as measured with GPC was 32,700, and Mw/Mn was 1.39.

The obtained fuorine-containing cycloolefin polymer was applied onto a $CaF_2$ substrate in the same manner as in Example 8. Then, the coating substrate was dried in vacuo at 100° C., and a VUV spectrum was measured. The absorption coefficient at 157 nm was 0.066 $\mu m^{-1}$.

Example 23

A ring-opening metathesis polymer of 1.7 g was obtained in the same manner as in Example 22, except that 1.7 g of the ring-opening metathesis polymer powder obtained in Example 22 was subjected to hydrogenation reaction for 40 hours. From the $^1$H-NMR spectrum, the degree of hydrogenation of the obtained ring-opening metathesis polymer was found to be 40%, and this ring-opening metathesis polymer was a partially hydrogenated polymer.

Thereafter, in a 100 ml Teflon-lining autoclave, the ring-opening metathesis polymer was dissolved in metaxylene hexafluoride. Then, 0.40 g of a fluorine gas was introduced, and the autoclave was pressurized with nitrogen to perform addition reaction at 30° C. for 100 hours. After the autoclave was purged with nitrogen at room temperature, the remaining fluorine gas was replaced with nitrogen at 50° C. and thereby released. The reaction solution was introduced into methanol to precipitate a hydrogen/fluorine addition product of the ring-opening metathesis polymer, and this addition product was washed with water and hot water, separated by filtration and dried in vacuo to obtain 1.9 g of a white powdery ring-opening metathesis polymer hydrogen/fluorine addition product (fluorine-containing cycloolefin polymer).

In the $^1$H-NMR spectrum and the $^{13}$C-NMR spectrum of the obtained fuorine-containing cycloolefin polymer, any peak assigned to a double bond of the main chain carbon was not observed. The weight-average molecular weight Mw as measured with GPC was 31,500, and Mw/Mn was 1.33.

The obtained fuorine-containing cycloolefin polymer was applied onto a $CaF_2$ substrate in the same manner as in Example 22. Then, the coating substrate was dried in vacuo at 100° C., and a VUV spectrum was measured. The absorption coefficient at 157 nm was 0.073 $\mu m^{-1}$.

Example 24

The fluorine-containing cycloolefin polymers synthesized in Examples 1 to 4 and Examples 8 to 13 were measured on the refractive index, light transmittance at wavelength of 193 nm and 400 nm, glass transition temperature (Tg) and 5% decomposition temperature (Td5). The results are set forth in Table 4.

TABLE 4

| | Polymer synthesized in Ex. 1 | Polymer synthesized in Ex. 2 | Polymer synthesized in Ex. 3 | Polymer synthesized in Ex. 4 | Polymer synthesized in Ex. 8 | Polymer synthesized in Ex. 9 |
|---|---|---|---|---|---|---|
| Refractive index | 1.42 | 1.41 | 1.41 | 1.42 | 1.37 | 1.39 |
| Transmittance | | | | | | |
| 400 nm | 100 | 100 | 100 | 100 | 100 | 100 |
| 193 nm | 100 | 100 | 99 | 99 | 100 | 100 |
| Tg (° C.) | 47 | 72 | 44 | 25 | 105 | 120 |
| Td5 (° C.) | 395 | 399 | 372 | 374 | 394 | 389 |

| | Polymer synthesized in Ex. 10 | Polymer synthesized in Ex. 11 | Polymer synthesized in Ex. 12 | Polymer synthesized in Ex. 13 |
|---|---|---|---|---|
| Refractive index | 1.32 | 1.32 | 1.29 | 1.34 |
| Transmittance | | | | |
| 400 nm | 100 | 100 | 100 | 100 |
| 193 nm | 100 | 100 | 100 | 100 |
| Tg (° C.) | 142 | 95 | 154 | 89 |
| Td5 (° C.) | 402 | 399 | 430 | 328 |

Refractive index measuring wavelength: 633 nm
Transmittance measuring wavelength: 400 and 193 nm Comparative Example 5

The cycloolefin polymers synthesized in Comparative Examples 1 and 2 were measured on the refractive index, light transmittance at wavelength of 193 nm and 400 nm, glass transition temperature (Tg) and 5% decomposition temperature (Td5). The results are set forth in Table 5.

TABLKE 5

| | Polymer synthesized in Comp. Ex. 1 | Polymer synthesized in Comp. Ex. 2 |
|---|---|---|
| Refractive index | 1.49 | 1.54 |
| Transmittance | | |
| 400 nm | 100 | 99 |
| 193 nm | 100 | 90 |
| Tg (° C.) | 15 | 206 |
| Td5 (° C.) | 423 | 430 |

Refractive index measuring wavelength: 633 nm
Transmittance measuring wavelength: 400 and 193 nm

INDUSTRIAL APPLICABILITY

The fluorine-containing cycloolefin polymer of the invention has excellent light transmission in the vacuum ultraviolet region. Further, the polymer of the invention is excellent in electrical properties, heat resistance and adhesion to a substrate, hardly suffers deterioration due to photodecomposition, has excellent light resistance, and is suitable for a pellicle, a photoresist material and an optical material which are used for semiconductor production using vacuum ultraviolet rays. The fluorine-containing cycloolefin monomer and the process for preparing a fluorine-containing cycloolefin polymer according to the invention are of industrially great value.

What is claimed is:

1. A fluorine-containing cycloolefin polymer having at least a repeated unit structure represented by the following formula (1) and having an absorption coefficient of not more than 3.0 $\mu m^{-1}$ at 157 nm of ultraviolet rays;

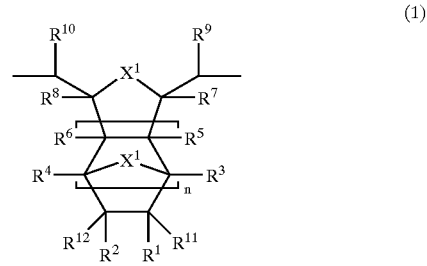

(1)

wherein at least one of $R^1$ to $R^{12}$ and $X^1$ is the following fluorine or fluorine-containing group, $R^1$ to $R^{12}$ are each fluorine or a fluorine-containing group selected from a fluorine-containing alkyl group of 1 to 20 carbon atoms, a fluorine-containing aryl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 2 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms, X¹ is a fluorine-containing group selected from —CR$^a$R$^b$—, —NR$^a$— and —PR$^a$— (with the proviso that at least one of R$^a$ and R$^b$ in —CR$^a$R$^b$— and R$^a$ in —NR$^a$— and —PR$^a$— are each selected from fluorine, a fluorine-containing alkyl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 2 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms), X¹ may be selected from —O— and —S—, at least two of R$^1$, R$^2$, R$^{11}$ and R$^{12}$ may be bonded to each other to form a cyclic structure, and n is 0 or an integer of 1 to 3.

2. The fluorine-containing cycloolefin polymer as claimed in claim 1, wherein in the formula (1), R$^1$ to R$^{12}$ other than R$^1$ to R$^{12}$ which are each fluorine or a fluorine-containing group are each hydrogen or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms, when X¹ is a group other than a fluorine-containing group, R$^a$ and R$^b$ are each hydrogen or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms, and X¹ may be selected from —O— and —S—, and at least two of R$^1$, R$^2$, R$^{11}$ and R$^{12}$ may be bonded to each other to form a cyclic structure.

3. A cycloolefin monomer of the fluorine-containing cycloolefin polymer as claimed in claim 1, which is represented by the following formula (2) or (3):

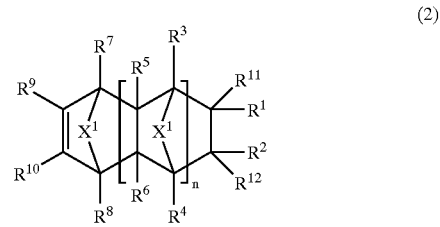

(2)

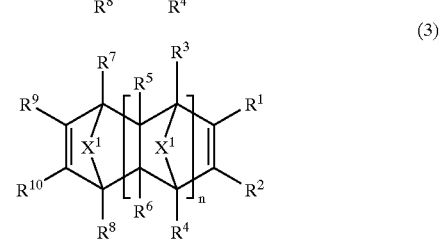

(3)

wherein at least one of R$^1$ to R$^{12}$ and X$^1$ in the formula (2) and at least one of R$^1$ to R$^{10}$ and X$^1$ in the formula (3) are each fluorine or a fluorine-containing group, R$^1$ to R$^{12}$ in the formula (2) and R$^1$ to R$^{10}$ in the formula (3) are each fluorine or a fluorine-containing group selected from a fluorine-containing alkyl group of 1 to 20 carbon atoms, a fluorine-containing aryl group of 1 to 20 carbon atoms, a fluorine-containing and silicon-containing alkyl group of 1 to 20 carbon atoms, a fluorine-containing alkoxy group of 1 to 20 carbon atoms, a fluorine-containing and ether group-containing alkyl group of 2 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 2 to 20 carbon atoms, and a fluorine-containing and iodine-containing alkyl group of 1 to 20 carbon atoms, X¹ in the formulas (2) and (3) is a fluorine-containing group selected from —CR$^a$R$^b$—, —NR$^a$— and —PR$^a$— (with the proviso that at least one of R$^a$ and R$^b$ in —CR$^a$R$^b$— and R$^a$ in —NR$^a$— and —PR$^a$— are each selected from fluorine, a fluorine-containing alkyl group of 1 to 20 carbon atoms, a fluorine-containing and silicon-containing alkyl group of 1 to 20 carbon atoms, a fluorine-containing and alkoxy group of 1 to 20 carbon atoms, a fluorine-containing and ether group-containing alkyl group of 2 to 20 carbon atoms, a fluorine-containing alkoxycarbonyl group of 2 to 20 carbon atoms, a fluorine-containing alkylcarbonyl group of 2 to 20 carbon atoms, a fluorine-containing and ester group-containing alkyl group of 3 to 20 carbon atoms, a fluorine-containing and carboxyl group-containing alkyl group of 2 to 20 carbon atoms, a fluorine-containing and cyano group-containing alkyl group of 2 to 20 carbon atoms, a fluorine-containing and chlorine-containing alkyl group of 1 to 20 carbon atoms, a fluorine-containing and bromine-containing alkyl group of 1 to 20 carbon atoms, and a fluorine-containing and iodine-containing alkyl group of 1 to 20 carbon atoms), $R^1$ to $R^{12}$ other than $R^1$ to $R^{12}$ which are each fluorine or a fluorine-containing group in the formula (2) and $R^1$ to $R^{10}$ other than $R^1$ to $R^{10}$ which are each fluorine or a fluorine-containing group in the formula (3) are each hydrogen or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms, when $X^1$ is a group other than a fluorine-containing group in the formulas (2) and (3), $R^a$ and $R^b$ are each hydrogen or a group selected from an alkyl group of 1 to 20 carbon atoms, a silicon-containing alkyl group of 1 to 20 carbon atoms, an alkoxy group of 1 to 20 carbon atoms, an alkoxycarbonyl group of 2 to 20 carbon atoms, a carbonyl group, an alkylcarbonyl group of 2 to 20 carbon atoms, a cyano group, a cyano group-containing alkyl group of 2 to 20 carbon atoms, an ester group-containing alkyl group of 3 to 20 carbon atoms, an ether group-containing alkyl group of 2 to 20 carbon atoms, a hydroxycarbonyl group, a carboxyl group-containing alkyl group of 2 to 20 carbon atoms, a hydroxyl group, a hydroxyl group-containing alkyl group of 1 to 20 carbon atoms, chlorine, bromine, iodine, a chlorine-containing alkyl group of 1 to 20 carbon atoms, a bromine-containing alkyl group of 1 to 20 carbon atoms and an iodine-containing alkyl group of 1 to 20 carbon atoms, and $X^1$ may be selected from —O— and —S—, $R^1$, $R^2$, $R^{11}$ and $R^{12}$ in the formula (2) may be bonded to each other to form a cyclic structure, and $R^1$ and $R^2$ in the formula (3) may be bonded to each other to form a cyclic structure, and n is 0 or an integer of 1 to 3.

4. A process for preparing the fluorine-containing cycloolefin polymer as claimed in claim 1, comprising subjecting at least one cycloolefin monomer represented by the formula (2) or (3) to ring-opening metathesis polymerization and then subjecting the obtained ring-opening metathesis polymer to at least one of hydrogenation, hydrogen fluoride addition and fluorine addition.

5. The fluorine-containing cycloolefin polymer as claimed in claim 1, wherein the repeated unit structure of the polymer, which is represented by the formula (1), is a repeated unit structure having a feature that the difference in the HOMO molecular orbital energy between a molecular model in which methyl group is bonded to each end of the unit structure and a molecular model which has the same carbon structure as the above molecular model but in which fluorine is replaced with hydrogen is in the range of 0.2 eV to 1.5 eV.

6. The cycloolefin monomer of the fluorine-containing cycloolefin polymer as claimed in claim 3, wherein the total sum of the number of all fluorine atoms contained in $R^1$ to $R^{12}$ in the formula (2) and the total sum of the number of all fluorine atoms contained in $R^1$ to $R^{10}$ in the formula (3) are each not less than 3.

7. The fluorine-containing cycloolefin polymer as claimed in claim 1, which is obtained using, as starting monomers, two or more cycloolefin monomers represented by the formula (2) or (3) and different from each other in at least one of $R^1$ to $R^{12}$, $R^1$ to $R^{10}$, $X^1$ and n.

8. The fluorine-containing cycloolefin polymer as claimed in claim 1, which is obtained using, as starting monomers, at least one cycloolefin monomer represented by the formula (2) or (3) wherein $X^1$ is —$CR^aR^b$— and at least one cycloolefin monomer represented by the formula (2) or (3) wherein $X^1$ is —O—.

9. The fluorine-containing cycloolefin polymer as claimed in claim 1, which is obtained using, as starting monomers, the cycloolefin monomer represented by the formula (2) or (3) and a fluorine-containing monocycloolefin.

10. The fluorine-containing cycloolefin polymer as claimed in claim 1, which has a weight-average molecular weight (Mw), as measured by gel permeation chromatography (GPC), of 500 to 1,000,000 in terms of polystyrene.

11. An optical part comprising the fluorine-containing cycloolefin polymer of any one of claims 1, 2, 5, 7, 8, 9 and 10.

12. A thin film and a coating material, each of which comprises the fluorine-containing cycloolefin polymer of any one of claims 1, 2, 5, 7, 8, 9 and 10, and a pellicle using the thin film or the coating material.

13. A photoresist composition containing the fluorine-containing cycloolefin polymer of any one of claims 1, 2, 5, 7, 8, 9 and 10.

14. A process for forming a pattern by lithography, using at least one of the thin film, the coating material, the pellicle using the thin film or the coating material, and the photoresist composition of claim 12.

15. A process for forming a pattern by lithography, using at least one of the thin film, the coating material, the pellicle using the thin film or the coating material, and the photoresist composition of claim 12.

* * * * *